United States Patent
Harris et al.

(10) Patent No.: US 7,707,571 B1
(45) Date of Patent: Apr. 27, 2010

(54) SOFTWARE DISTRIBUTION SYSTEMS AND METHODS USING ONE OR MORE CHANNELS

(75) Inventors: Emily J. Harris, Minneapolis, MN (US); Jeff A. Benson, Minneapolis, MN (US); Arthur R. Gorr, Buffalo, MN (US); James B. Hove, St. Paul, MN (US)

(73) Assignee: New Boundary Technologies Inc., Minneapolis, MN (US)

( * ) Notice: Subject to any disclaimer, the term of this patent is extended or adjusted under 35 U.S.C. 154(b) by 987 days.

(21) Appl. No.: 10/042,119

(22) Filed: Jan. 7, 2002

Related U.S. Application Data

(60) Provisional application No. 60/259,888, filed on Jan. 5, 2001.

(51) Int. Cl.
*G06F 9/445* (2006.01)

(52) U.S. Cl. .................... 717/177; 717/178; 717/174; 717/176

(58) Field of Classification Search .......... 717/168–178
See application file for complete search history.

(56) References Cited

U.S. PATENT DOCUMENTS

| | | | | |
|---|---|---|---|---|
| 4,724,521 | A * | 2/1988 | Carron et al. | 717/175 |
| 5,790,796 | A | 8/1998 | Sadowsky | |
| 5,845,090 | A | 12/1998 | Collins, III et al. | 95/200.51 |
| 6,047,129 | A * | 4/2000 | Frye | 717/172 |
| 6,049,671 | A * | 4/2000 | Slivka et al. | 717/173 |
| 6,067,582 | A * | 5/2000 | Smith et al. | 710/5 |
| 6,115,549 | A * | 9/2000 | Janis et al. | 717/172 |
| 6,123,737 | A * | 9/2000 | Sadowsky | 717/173 |
| 6,138,153 | A * | 10/2000 | Collins et al. | 709/221 |
| 6,272,536 | B1 | 8/2001 | van Hoff et al. | |
| 6,282,712 | B1 | 8/2001 | Davis et al. | |
| 6,286,041 | B1 * | 9/2001 | Collins et al. | 709/221 |
| 6,327,617 | B1 | 12/2001 | Fawcett | |
| 6,347,398 | B1 * | 2/2002 | Parthasarathy et al. | 717/178 |
| 6,493,871 | B1 * | 12/2002 | McGuire et al. | 717/173 |
| 6,615,405 | B1 * | 9/2003 | Goldman et al. | 717/174 |
| 6,633,899 | B1 * | 10/2003 | Coward | 709/202 |
| 6,769,009 | B1 * | 7/2004 | Reisman | 709/201 |
| 6,802,061 | B1 * | 10/2004 | Parthasarathy et al. | 717/173 |
| 6,966,002 | B1 * | 11/2005 | Torrubia-Saez | 726/29 |
| 7,162,538 | B1 * | 1/2007 | Cordova | 709/238 |
| 2001/0010046 | A1 * | 7/2001 | Muyres et al. | 705/52 |
| 2001/0029605 | A1 * | 10/2001 | Forbes et al. | 717/11 |
| 2002/0002704 | A1 * | 1/2002 | Davis et al. | 717/11 |
| 2002/0174422 | A1 * | 11/2002 | Kelley et al. | 717/178 |
| 2005/0044544 | A1 * | 2/2005 | Slivka et al. | 717/174 |
| 2006/0010437 | A1 * | 1/2006 | Marolia | 717/168 |

OTHER PUBLICATIONS

Forbes, J.A., et al., "Software Package Management", *Publication No.*: US2001/0029605; *Publication Date.*: Oct. 11, 2001, 20 pages.
Miyabe, Y., et al., "Information distribution System", *Publication No.*: US2001/0032188 A1; *Publication Date*: Oct. 18, 2001, 32 pages.
Slivka, B.W., et al., "Methods and Systems for Obtaining Computer Software Via a Network", *Publication No.* US 2001/0042112 A1; *Publication Date*: Nov. 15, 2001, 22 pages.

* cited by examiner

*Primary Examiner*—Insun Kang
(74) *Attorney, Agent, or Firm*—Schwegman, Lundberg & Woessner, P.A.

(57) ABSTRACT

A systems and methods for distributing software to one or more targets from a central location using one or more channels is described. A channel is a hierarchical list of targets and tasks. A task is a file, a script, or a command that is run or installed on a target computer. A target is a computer or group to receive the tasks.

2 Claims, 13 Drawing Sheets

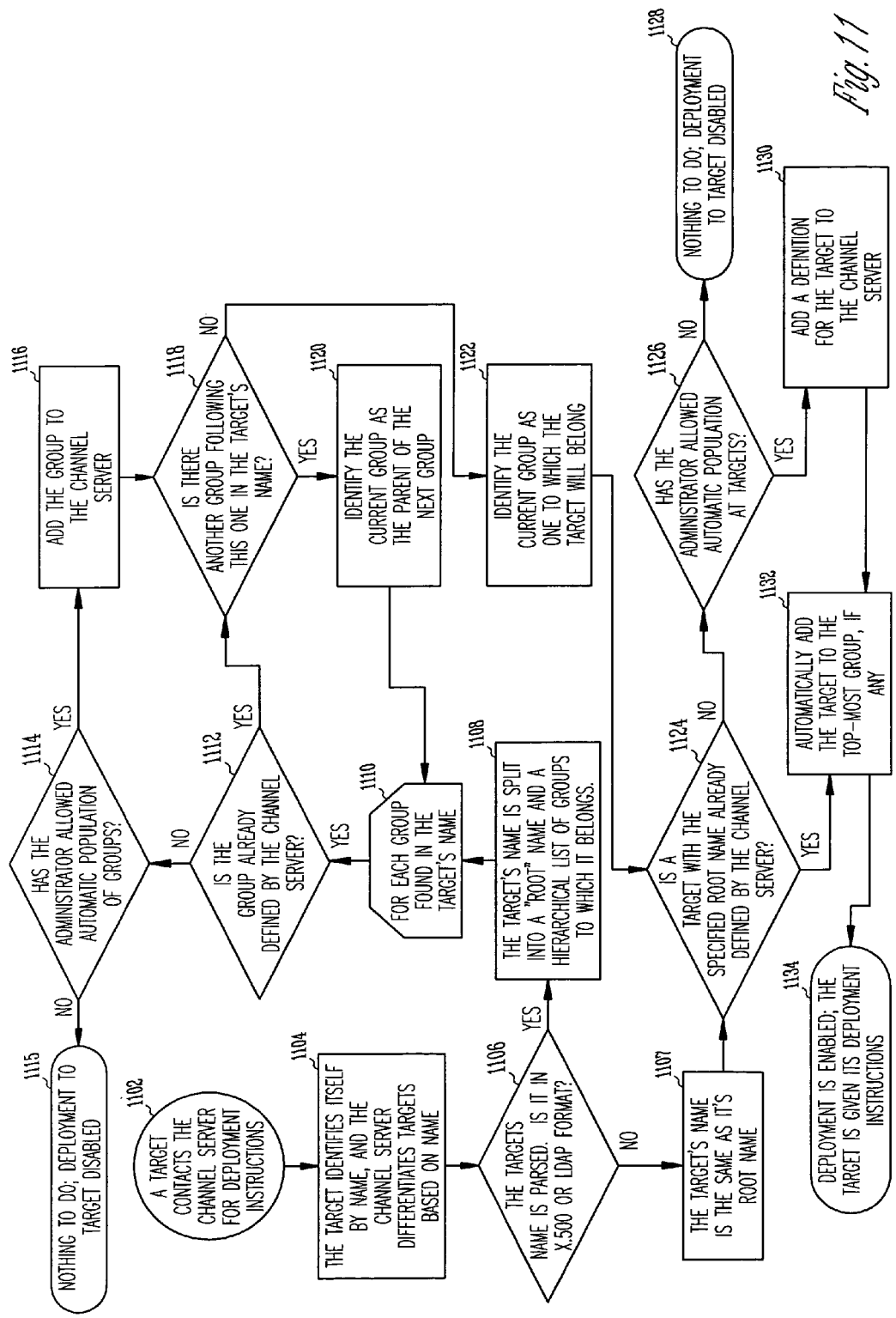

SOFTWARE DISTRIBUTION SYSTEMS AND METHODS USING ONE OR MORE CHANNELS

CROSS REFERENCES

This patent application claims the benefit of priority, under 35 U.S.C. Section 119(e), to U.S. Provisional Patent Application Ser. No. 60/259,888, entitled SOFTWARE DISTRIBUTION SYSTEM, filed Jan. 5, 2001.

This application is related to co-pending and co-assigned U.S. patent application Ser. No. 09/136,905, entitled SOFTWARE DISTRIBUTION, ERROR DETECTION AND REPAIR SYSTEM, filed Aug. 20, 1998. This application also is related to co-pending and co-assigned U.S. patent application Ser. No. 09/137,405, entitled CONFLICT CHECKING USING CONFIGURATION IMAGES, filed Aug. 20, 1998.

All three of these applications are incorporated herein by this reference.

FIELD OF THE INVENTION

The present invention relates generally to computer systems and more specifically to software distribution systems and methods.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 2001 LANOVATION. All Rights Reserved.

BACKGROUND OF THE INVENTION

A computer requires software to operate. In some computer systems, software is installed on individual computers from removable media such as a disk or CD-ROM. However, the task of updating software on individual computers in a large network is particularly time-consuming. Systems for distributing software over a network to one or more target computers are also available today. Because of the endless individual customization options, a software configuration on one computer rarely matches the software configuration on another computer. As a result, distributing software to differently configured computers is difficult. Thus, existing software distribution techniques are often inefficient and difficult.

BRIEF DESCRIPTION OF THE DRAWINGS

FIG. 11 is a more detailed flow chart of an example embodiment of the computerized method of auto-populating a channel.

DESCRIPTION OF THE EMBODIMENTS

Figure 1:
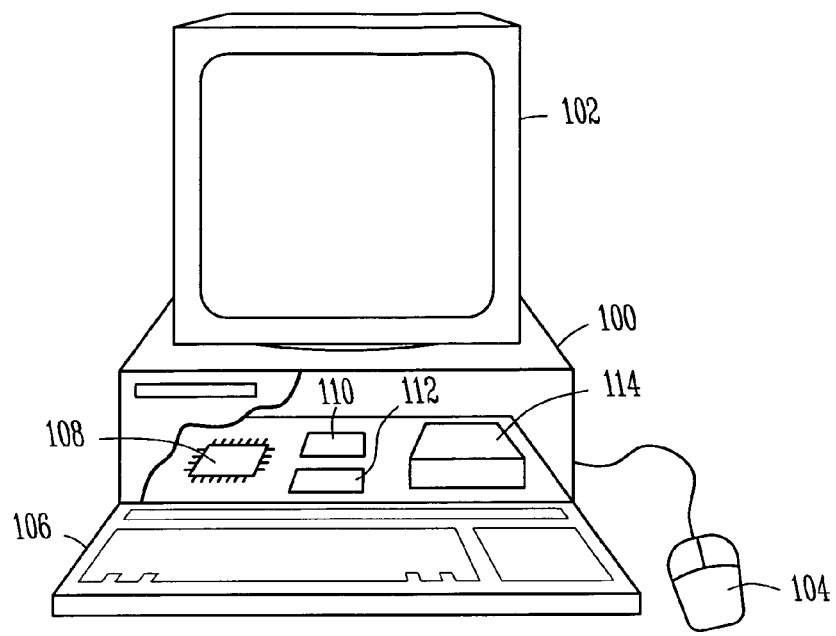
FIG. 1 is a diagram of an example hardware and operating environment in conjunction with which embodiments of the invention may be implemented.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention. It is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

Example embodiments of the invention are directed to a system and method for distributing software. The detailed description is divided into six sections. In the first section, terms are defined. In the second section, the hardware and the operating environment, in conjunction with which embodiments of the invention can be practiced, are described. In the third section, a system level overview of some embodiments of the invention is presented. In the fourth section, methods of using example embodiments of the invention are provided. In the fifth section, particular implementations of the invention are described according to one embodiment. In the final section, several alternate embodiments and examples are described.

DEFINITIONS

A "channel" is a mechanism for distributing software to one or more targets from a central location. A channel is a hierarchical list of targets and tasks. In one embodiment, a channel acts upon six types of "objects." The software to be deployed to multiple computers is defined by a "task" object. The task object is assigned to four other types of objects collectively called "target objects" that are to receive the software: "computers," "containers," "groups," and "users."

Finally, there is a sixth type of object, "licenses." A task is something that is to be executed on a computer. A computer is the entity to which tasks are assigned and on which they execute. A user is the individual using a computer, and is another entity to which a task can be assigned. Groups and containers are used to group and arrange computers and users. A license object defines a block of license numbers to be assigned to computers.

A "task" is a file, a script, or a command that is run or installed on a target computer.

A "target" is a computer or group to receive the tasks.

A "channel client" is a target computer and a "channel client component" is software installed on each target computer. The channel client is also referred to as a channel subscriber.

A "channel server" is a computer that maintains the one or more channels and deployment instructions. A "channel server component" is software that runs on the computer channel server. The channel server is also referred to as a channel manager.

A "channel deployment console" or a "channel console" is a computer that provides a user interface to create one or more channels. A "channel console component" is software that runs on the channel console. The channel deployment console is also referred to as a channel publisher.

An "administrator" is a person using the systems or methods described herein to deploy software to multiple computers. The new technology described below is not limited to corporate networks, however, so the use of the word "administrator" includes, but is not limited to a "network administrator."

A "user" is a person using a computer on which the software is to be deployed.

Hardware and Operating Environment

This section provides an overview of the hardware and the operating environment in conjunction with which embodiments of the invention can be practiced. FIG. 1 is a diagram of an example hardware and operating environment in conjunction with which embodiments of the invention may be implemented.

Computer 100 is operatively coupled to a monitor 102, a pointing device 104 and a keyboard 106. Monitor 102 permits the display of information for viewing by a user of the computer. Pointing device 104 permits the control of a screen pointer provided by a graphical user interface of a software distribution system as further described below. Keyboard 106 permits entry of textual information, including commands and data, into computer 100. Computer 100 is not limited to pointing device 104 and keyboard 106 for input devices. Any appropriate input device may be used.

Computer 100 comprises a central processing unit 108, random-access memory (RAM) 110, read-only memory (ROM) 112 and one or more storage devices 114. The central processing unit 108 represents a central processing unit of any type of architecture, such as CISC (Complex Instruction Set Computer), RISC (Reduced Instruction Set Computer) or the like. Although computer 100 is shown having only a single processor, embodiments of the present invention also apply to computers having multiple processors. RAM 110 and ROM 112 are collectively referred to as the memory of computer 100. The one or more storage devices 114 represent mechanisms for storing data. The one or more storage devices 114 may include magnetic disk storage media, optical storage media, and/or other machine-readable media. Although only one storage device 114 is shown, multiple storage devices and multiple types of storage devices may be present. In some embodiments, the storage devices 114 may be distributed across other electronic devices attached to a network. In one embodiment, storage device 114 stores one or more channels for a software distribution system as further described below.

The memory and the storage devices are types of computer-readable media. The computer-readable media provide storage for computer-readable instructions, data structures, program modules and other data for computer 100. Computer-readable instructions stored on a computer-readable medium are executable by the central processing unit 108 of computer 100. The computer-readable instructions perform methods of distributing software as further described below.

Embodiments of the invention are not particularly limited to any type of computer 100. The computer 100 operates in a networked environment using logical connections to one or more remote computers.

The hardware and operating environment in conjunction with which embodiments of the invention can be practiced has been described.

System Level Overview

Figure 2:
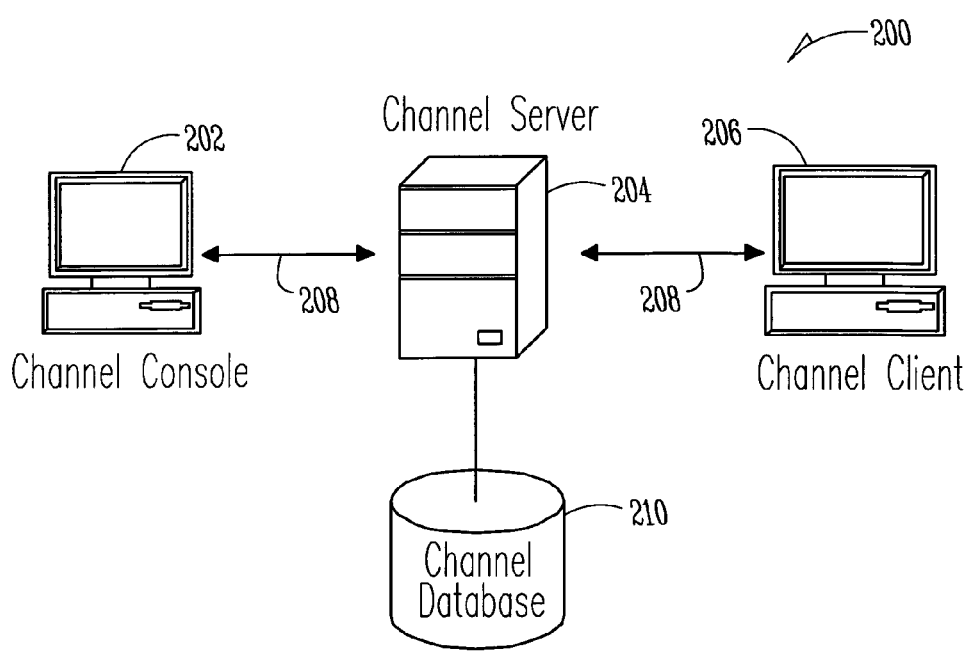
FIG. 2 is a block diagram of a software distribution system according to an example embodiment of the invention.

A system level overview of the operation of an example embodiment of the invention is described by reference to FIG. 2. FIG. 2 is a block diagram of a software distribution system according to an example embodiment of the invention. The software distribution system 200, as shown in FIG. 2, comprises a channel console 202, a channel server 204 and a channel client 206.

The channel console 202 provides a user interface to create one or more channels. Each one of the channels comprises a list of one or more targets and one or more tasks assigned to each one of the targets. The user interface also creates deployment instructions comprising a location for each one of the tasks. In one embodiment, at least one of the tasks is stored in a different location than the channel.

A task is something that is to be executed on a computer. It is the channel's job to take a task defined by an administrator and automatically execute it on any number of computers. A task is "assigned" to one or more of the target objects. In one embodiment, the task deploys software in the form of a configuration image file. A task, however, can also be a script or custom command. In one embodiment, there are three possible types of tasks:

Deploy a file,

Execute a script, and

Execute a custom command or commands provided by the user.

In one embodiment, each task is also associated with instructions for "rolling it back," in other words, doing the reverse of executing it. In the case of deploying a file, this is the act of "uninstalling" that same file. In the case of the other types of tasks, the administrator can optionally define a script or custom commands that are to be used to "roll back" the task.

In another embodiment, each task will optionally allow the definition of custom rules for determining whether the task has already been executed on a particular computer. This will be useful when defining a task that had already been completed on some computers before the task was assigned. These custom rules allow the specification of environment variables, files, and/or registry values to be queried to determine the task's completion status.

In still another embodiment, a task can also be enhanced with "upgrade tasks." An upgrade task is one to be executed after the main task. A common scenario might be to provide an "upgrade task" that updates an application on users' computers from version 2.0 to 2.1. The main task would execute, ensuring the successful installation of version 2.0, and then the upgrade task would execute after it, automatically performing the upgrade. For those who already had version 2.0 (depending on whether the custom rules described above are in use), only the upgrade to version 2.1 is actually installed.

In an alternate embodiment, a task allows the administrator to define "prerequisites," conditions that must be present (or absent) on computers before the task will execute. Like the custom rules for determining the task-completion status, these conditions are based on environment variables, files, and/or registry values. Where the task represents a configuration image file, these prerequisites exist in addition to, rather than instead of, the prerequisites that can be found in the configuration image file's properties.

The channel console 202 is the means by which the administrator controls the channel and its database. It is a graphical user interface that allows the objects in a channel database to be manipulated. In an example embodiment, this graphical interface has three manifestations: a standard Windows application, a control within a web browser, and an MMC module.

In the form of a standard Windows application, the channel console 202 contains two lists positioned side-by-side with a vertical separator between them that allows their relative sizes to be changed. The list on the left is a tree-like hierarchy of branches representing containers and other objects called the "tree view." At its "root," the tree view has two branches, "Targets" and "Tasks."

The "Targets" root node contains all of the "target objects" that do not themselves belong to a container, which could be containers, groups, users, and/or computers. Each container branch contains the target objects it contains, which could also be any of the four different target object types. Each group node contains the computers and users it contains. Each computer node contains a list of the users in the channel database who use the computer. User nodes do not have any further nodes below them.

The "Tasks" root node contains all the task objects defined in the channel database. Like the target objects, the tasks can optionally be assigned to "containers" for ease of use and to avoid name collisions. The root "Tasks" node thus contains containers and tasks that do not themselves belong to a container. Each container under the "Tasks" root node has nodes under it for the containers and tasks it contains.

The "task" and "target" objects are divided into two separate root nodes to avoid ambiguity between existence and assignment. For instance, if a task "spreadsheet" were located in the "marketing" container, a tree view that was not divided into separate root nodes would make it impossible to determine whether the task "spreadsheet" belonged to the container "marketing" or was assigned to it. The latter would mean that the task was merely placed in the container for convenience of organization, while the former would mean that every computer or user in the container would receive the task. Another motivation for the parallel "tasks" and "targets" nodes is to make administration using drag-and-drop more effective. An alternate design would be to force all tasks to be created at the "root" level; in other words they would all be parallel to one another, and they could not belong to a container.

To the right of the divider is a standard, non-hierarchical list control, called the "list view." Its primary purpose is to display tasks and their current status. When one of the nodes under the "Targets" root node is highlighted in the tree view, the list view is populated with all the tasks directly or indirectly assigned to that target object. There are different columns indicating installation information for the task, which may be blank if the target object is a container or group representing a collection of other objects. The list view also contains duplicates of the nodes underneath the node highlighted in the tree view. This is similar to the way Windows' Explorer program works; the "tasks" represent the files within a folder. They appear on the right side, not the left, while the target objects (like Explorer's folders representing the hierarchy of the file system) appear in both the tree and list views. Tasks cannot be assigned to the root "Targets" node, and so do not appear when that node is highlighted.

When a node underneath the root "Tasks" node is highlighted, the behavior is similar, except that the tasks are displayed independently of the target objects to which they are assigned, so the informational columns is more generic in nature, and editing options such as the distribution schedule for a specific computer may not be readily available. Here, too, containers that hold tasks or other containers under the "Tasks" root node are displayed in both the tree and list views.

With the exception of the "root" nodes discussed above and the container objects, the administrator can choose any object anywhere in either the tree or list views and receive a detailed, context-sensitive report on the distribution results for that object. Getting such a report for a user, for instance, will display a window with the results for all the tasks directly or indirectly assigned to the user. The window can be toggled to display either an overall report on task distribution results, or the complete list of distribution results for a single task. Similarly, invoking such a report for a task will display distribution results for all the objects to which it is assigned or detailed results for a single object. When the current selection in the tree view is a user, for instance, this report will default to the results for that user alone.

Reports on distribution results can be printed or exported to a text-based file for subsequent analysis. The administrator can control what fields are inserted in this text-based file.

The channel console 202 will also have an "alerts" window that can be manually invoked or configured to display error conditions as they occur. The definition of what constitutes an "alert condition" will be configurable. It will also be possible to configure custom actions that are to be taken when certain errors occur, such as sending a message to the administrator's e-mail address.

In one embodiment, as a control within a web-browser, the channel console 202 will present a much "flatter" view of the channel objects. Objects will be presented as a list of links; clicking on various links will display a new list of sub-objects, display the chosen object's properties, display the object's distribution status, or allow the object to be assigned to another object. There will also be an equivalent to the "alerts" window in the Windows application version.

In another embodiment, as an MMC module, the console will appear as one of the administrative tools in the Windows NT/2000 folder designed for this purpose. It will also incorporate specific knowledge of the Windows NT-based network to ease administration, and will display computers and users in a manner consistent with MMC. In most other aspects it will be similar or identical to the Windows application version of the console.

In one embodiment, there can be any number of channel consoles 202 using the same channel at the same time. It is the channel server's 204 responsibility to coordinate the changes they make with each other. The channel server 204 maintains the one or more channels and the deployment instructions In one embodiment, the channel server 204 is a Windows executable program, service, and/or module without a visible interface. The channel server 204 communicates information about the database to the channel console 202 and channel client 206 components, and makes changes to the database dictated by the channel console 202. In one embodiment, there is only one channel server 204 for each channel database 210, but the reverse is not necessarily true; one channel server 204 can control multiple channel databases. The channel server 204 is not a visible component; it is installed and manipulated solely via the channel console 202.

The one or more channel clients 206 perform the tasks assigned to the targets. In one embodiment, the channel client 206 is a Windows application that must be installed on every computer to which channel tasks are to be assigned. The application's sole interface, aside from optional user interaction during deployments, is an icon on the "task bar" and an applet in Windows' Control Panel. Clicking on the task-bar icon and the Control-Panel applet are identical actions and allow the settings for the client to be viewed or edited in the form of a property sheet.

The channel client 206 can be assigned tasks from multiple channels, and maintains a list of channels to which it "subscribes." The ability to add and remove channels is provided in one of the pages of the property sheet. The administrator, using Windows' policies, can control this ability, along with the ability to edit the client's settings.

In one embodiment, the channel client 206 executes on a computer as soon as the operating system starts and before any users have logged on, allowing distribution whether or not someone has started using the computer. After initially contacting each channel and potentially executing any tasks assigned it, the client continues execution in the background using a minimum of system resources waiting for new instructions from the channels. As users log on and off, the client performs any tasks that have been assigned to users rather than computers as appropriate.

The channel console 202, the channel server 204 and the channel client 206 are computers such as the computer 100 shown in FIG. 1. Although not depicted, in some embodiments the channel console 202 and the channel server 204 are a single computer.

The channel console 202, the channel server 204 and the channel client 206 are connected by a network 208. The network 208 may be any suitable network and may support any appropriate protocol suitable for communication between channel console 202, channel server 204 and one or more channel clients 206. In an example embodiment, network 208 uses a TCP/IP (Transmission Control Protocol/Internet Protocol) protocol for communications. In one embodiment, the network 208 supports hard-wired communications, such as a telephone line or cable. In a further embodiment, the network 208 supports wireless communications. In another embodiment, the network 208 is the Internet. In still another embodiment, the network 208 is a local area network (LAN) or a wide area network (WAN). Although one network 208 is shown, in other embodiments any number of networks (of the same or different types) may be present and various channel clients 206 may use the same network or different networks.

In one embodiment, the TCP/IP network also supports name resolution to the extent necessary to use names rather than network addresses for channel identification.

A concern removed by the example embodiment using a TCP/IP network is file permissions. The channel server 204 has the ability to receive and send data of any type without any network permissions being defined. The channel client 206 can receive tasks and report results, and the channel console 202 can assign tasks and view results, without any permissions of any kind.

The TCP/IP network allows channels to be viable distribution mechanisms in two example embodiments:

It is frequently the case that remote users of an enterprise have Internet connectivity to their organization's network, but are not authenticated to the network operating system. With TCP/IP as the transport mechanism, channels will work perfectly in this situation.

Channels could be used outside of the context of an enterprise. For instance, a computer manufacturer may wish to use channels to provide software updates for their customers. A system involving network permissions of some kind would fall well short, but a TCP/IP connection would work very well. If a customer can browse to the manufacturer's web site, they can also subscribe to their channel.

TCP/IP connectivity will be passive and self-configuring. This means that the channel client 206, when it executes, will determine all possible TCP/IP transports available on the system and use whichever one can be used to reach the channels to which it subscribes. In one embodiment, where two or more such transports are available for a given channel, the channel client 206 will prefer a LAN connection to a dial-up connection. In one embodiment, where a connection is not immediately available, the channel client 206 will not attempt to initiate one. This means that a dial-up channel client 206 will receive tasks only when they explicitly make a connection. A channel client 206's properties can be optionally edited to associate a channel with a specific connection and prevent the client from attempting all possible connections.

The channel console 202 will behave in similar fashion, but will also attempt to establish a connection where none is present, potentially requiring intervention by the user.

Finally, the channel server 204 will automatically "listen" for requests from channel console 202 and channel client 206 on all available connections, and respond to them on the same one. It, too, can optionally be configured to use a specific connection.

In one embodiment, the software distribution system 200 further comprises a channel database 210 to store the one or more channels and the deployment instructions. In one embodiment, a channel database is a folder containing a hierarchy of files and sub-folders in a format invented by Lanovation. The database is used to store information about the objects used in the implementation of the channel.

Each object in the database has a unique identifying number between 0 and $2^{32}$ exclusive. Each object also has a name, which must be unique in comparison with the names of other objects of the same type. For example, there can be only one object of any type with the unique number "120." There can be a user with the name "Paul" and a computer with the name "Paul," but there cannot be two users that share the name "Paul." The root of the database's folder contains a series of files ending in the file extension "SFTCHI" and starting with the name of each object type. These files are called "channel index files." There is only one file like this for each of the six types of object in the database. For a channel database whose folder is "C:\CHANNEL1," for example, there would be a "C:\CHANNEL1\Containers.SFTCHI" file and five others like it. These files are each a binary list of associations between object names and object numbers designed for fast, efficient, and error-free access and modification.

There are also six sub-folders, one for each of the different object types. The names of these folders are, like the index files described above, the same as the names of the object types. Each of these sub-folders contains files that represent, in binary format, the individual properties of the objects of that type. These files are called "channel data files," and they have the extension "SFTCHD." They are formed from the 8 hexadecimal digits of the object's unique identifying number.

For instance, the properties for the user object with the unique number 200 can be found in the file "C:\CHANNEL1\Users\000000C8.SFTCHD" in our example. In addition to storing an object's properties, these files store the associations between different objects; for instance, the file for a user object may contain an associated list of the tasks assigned the user, along with the user's container and groups. All such associations are stored in the files for both objects involved in the association, allowing for the efficient retrieval and manipulation of data in the database under all circumstances. For example, if the task with the unique number "2" is assigned to the computer with the unique number "3," that fact is recorded in both the files "C:\CHANNEL1\Tasks\00000002.SFTCHD" and "C:\CHANNEL1\Computers\00000003.SFTCHD."

In the sub-folders for users, computers, and tasks there is also a set of files that follow the same naming convention as the channel data files but that represent the results of distributions and have the extension "SFTCHR." These files, too, contain a list of associations, in this case between a task and the computer and/or user who received the task. Each association in the files contains additional data such as the time and date of the execution of the task and any errors that may have occurred.

When a channel is first created, it is programmatically assigned a globally unique identifier stored in the channel's properties.

Figure 3:
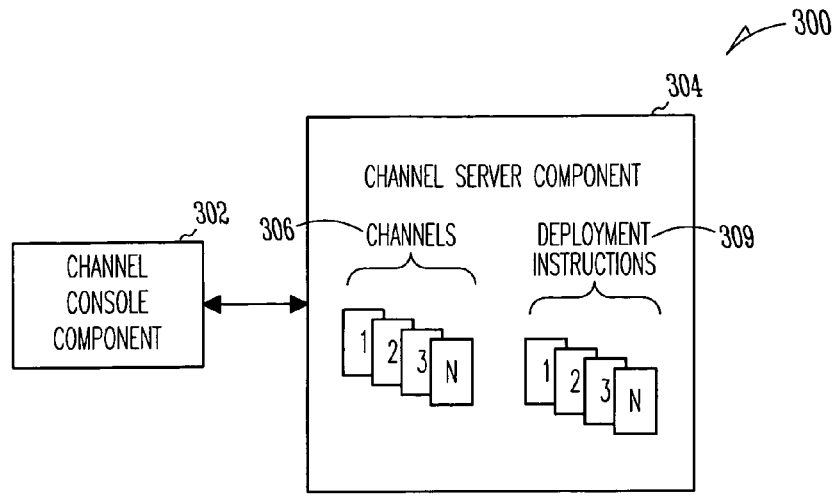
FIG. 3 is a block diagram of the processing modules for an example embodiment of the system of FIG. 2.

FIG. 3 is a block diagram of the processing modules for an example embodiment of the system of FIG. 2. The computer system comprises a channel console component 302 to provide a user interface to create one or more channels 306 comprising a list of targets and tasks, and a channel server component 304 to store the one or more channels, wherein at least one of the tasks is stored in a different location than the channel. The channel server component 304 also provides deployment instructions 309 for the tasks in the one or more channels 306. In one embodiment, the list of targets comprises computers, users, groups or containers. In one embodiment, the list of tasks comprises files (or packages), scripts and commands.

Figure 4:
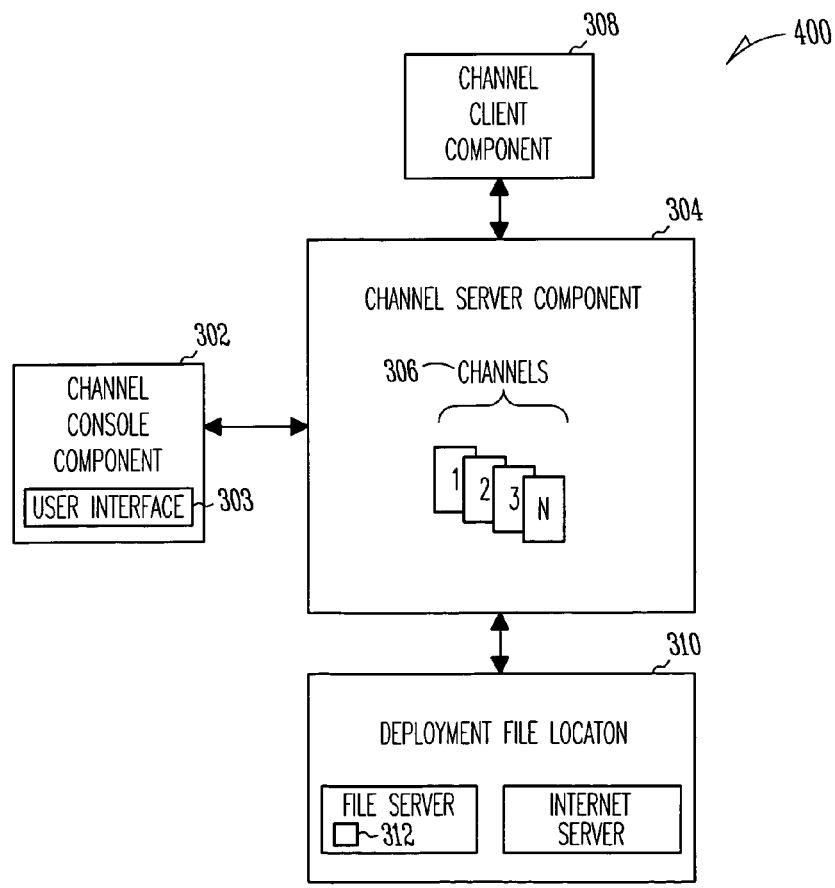
FIG. 4 is a block diagram of an alternate embodiment of the processing modules for the system of FIG. 2.

FIG. 4 is a block diagram of an alternate embodiment of the processing modules for the system of FIG. 2. The processing modules for the computer system comprises a channel console component 302 to provide a user interface 303 to create one or more channels 306 and a channel server component 304 to store the one or more channels 306. At least one of the tasks 312 is stored in a different location 310 than the channel 306. The processing modules further comprise a channel client component 308 to execute on each one of the targets and to perform the tasks assigned to the targets.

Figure 5:
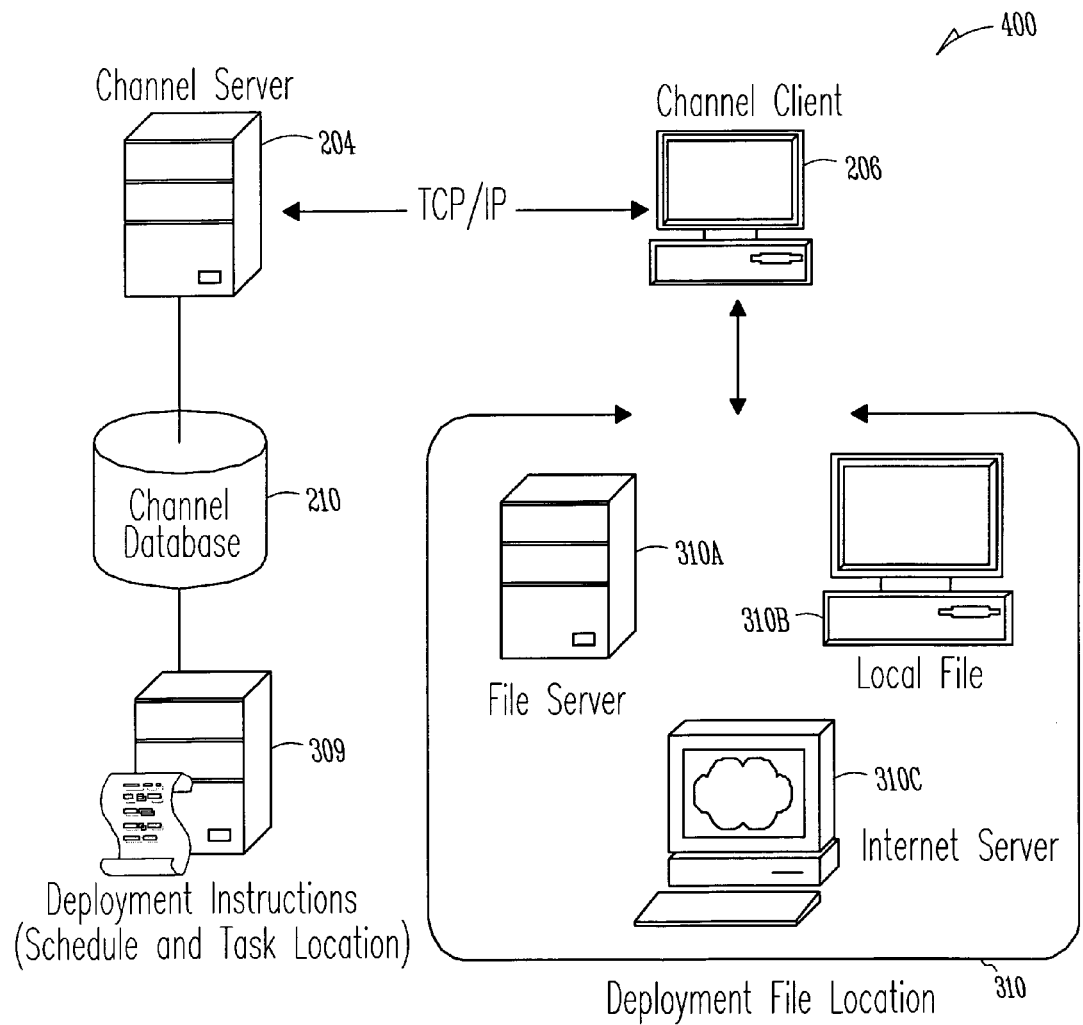
FIG. 5 is a block diagram of a software distribution system according to an alternate embodiment of the invention.

FIG. 5 is a block diagram of a software distribution system according to an alternate embodiment of the invention. The software distribution system shown in FIG. 5 comprises a channel server 204 and a channel client 206. In one embodiment, the channel server 204 stores the one or more channels 306 in a channel database 210. The channel database 210 also stores deployment instructions 309 for a channel. In one embodiment, the deployment instructions 309 include a schedule and a task location. In the example embodiment shown in FIG. 5, the deployment file location 310 is a different location than the channel server 204.

An alternate embodiment comprises a computer-readable medium having computer executable modules comprising: a channel client component to receive tasks assigned to one or more channels, and the channel client component to perform the task without creating a temporary copy of the software on the target computer.

In still another embodiment, the channel server 204 is capable of automatically populating the channels. Auto-population of channels eliminates the time-consuming task for an administrator of manually adding computers in a large network to a channel. In some embodiments, the auto-population functions can be turned off by an administrator. When the auto-population functions are turned off, targets are added to the channel manually.

Each computer that has the channel client component 308 installed and is configured to subscribe to a channel, sends identification information to the channel server component 304. If the auto-population functions are turned on, the channel server component 304 adds the computer to the channel automatically. For example, if the channel client component 308 is installed with a subscription file (described in more detail by reference to FIG. 13) the computers that received and installed the channel client component 308 are added to the channel automatically when they contact the channel. In some embodiments, auto-population functions are used for remote users. In this example, the computer for the remote user is added when the remote user logs on to the network or connects through a dial-up connection and the channel client component contacts the channel.

When a channel is accessed by a new computer (i.e., a computer that has not previously accessed the channel), one or more of the following auto-populate options may occur: create new computers, create new groups, and add computers to groups. The first option is to automatically add computers when the computer contacts the channel. A computer can contact the channel if the channel client component 308 is installed and the computer is subscribed to the channel.

The second option is to automatically create new groups. A new group or sub-group is automatically created when a new computer contacts the channel server 204 to request channel information. In one embodiment, the new group or sub-group is created based on one of the following: (a) network containers defined as part of a directory services structure such as NDS (Novell Directory Services) or AD (Active Directory), or (b) channel client 206 variable settings using the environment variable % pt_computer %.

The third option is to automatically add computers to groups. Computers are automatically added to groups in the channel in either of the following cases: (a) the groups have been set up in advance and they correspond to those defined by the directory services structure or the structure defined by the environment variable % pt_computer %, or (b) the groups are created automatically according to the second option described in the previous paragraph.

In one embodiment, an apparatus such as channel server 204 comprises a memory, a central processing unit, and computer executable instructions executed by the central processing unit from the memory to automatically populate a channel. The computer executable instructions cause the channel server 204 to create a channel comprising a list of tasks and deployment instructions for the tasks and to automatically add a computer to the channel upon receiving a request from the computer for deployment instructions.

In an alternate embodiment, the computer executable instructions cause the channel server 204 to automatically create one or more groups and to automatically add the computer to the one or more groups. In one embodiment, the one or more groups are created based on one or more network containers defined as part of a directory services structure for the computer. Examples of a directory services structure include, but are not limited to, Novell Directory Services and Active Directory. In another embodiment, the computer executable instructions cause the channel server 204 to automatically add a computer to the channel.

In still another embodiment, an apparatus comprises a memory, a central processing unit, and computer executable instructions to create a channel comprising a list of tasks and deployment instructions for the tasks, and to provide a first file to install a channel client component on the target computer, and to provide a second file to install a service on the target computer, wherein one or more of the first files and the second file are installed on the target computer over a network. In one embodiment, the second file allows the channel client 206 to be installed on the target computer without a user logged on to the target computer. In another embodiment, the second file allows the channel client 206 to be installed on the target computer regardless of the user's permissions.

In yet another embodiment, an apparatus comprises a memory, a central processing unit, and computer executable instructions to create a channel comprising a list of tasks and deployment instructions for the tasks, and to provide a first file to install a channel client component on the target computer, and to provide a second file to install a service on the target computer, wherein one or more of the first files and the second files are provided to the target computer through a subscription file. In one embodiment, the second file allows the channel client 206 to deploy tasks without a user logged on to the channel client 206. In another embodiment, the second file allows the channel client 206 to be installed on the target computer regardless of the user's permissions.

METHODS OF THE INVENTION

In this section, the particular methods performed by a computer, such as local computer 100 of FIG. 1, in an exemplary embodiment, are described by reference to a flowchart. The methods to be performed constitute computer programs made up of computer-executable instructions. Describing the methods by reference to a flowchart enables one skilled in the art to develop such programs including such instructions to carry out the methods on suitable computerized systems (the processor of the computer executing the instructions from a computer-readable media).

Figure 6:
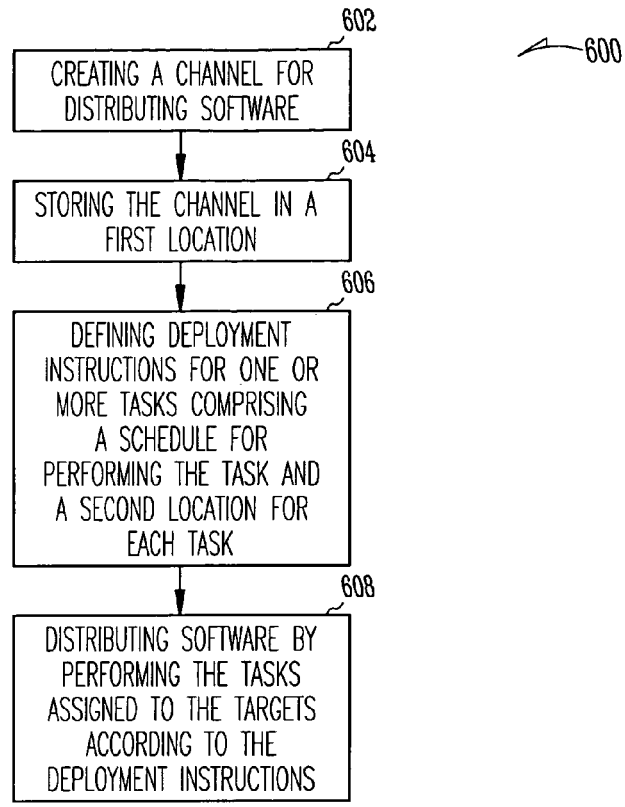
FIG. 6 is a flow chart of an example embodiment of a computerized method of deploying software in which the tasks are stored in a different location than the channels.

FIG. 6 is a high-level flow chart of an example embodiment of a computerized method of deploying software in which the tasks are stored in a different location than the channels. As shown in FIG. 6, the method 600 comprises creating a channel for distributing software (block 602). The channel comprises a list of one or more targets and one or more tasks assigned to the target. The channel is stored in a first location (block 604). Deployment instructions are defined for the one or more tasks (block 606). The deployment instructions comprise a schedule for performing the task and a second location for each task. In one embodiment, the second location for at least one task is different than the first location. Finally, the software is distributed by performing the tasks assigned to the targets according to the deployment instructions (block 608).

Figure 7:
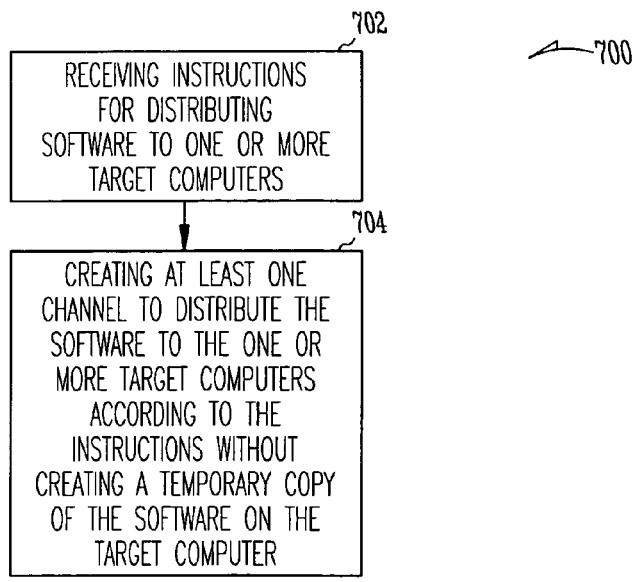
FIG. 7 is a high-level flow chart of an alternate embodiment of a method of deploying software in which no temporary copy of the software is made on a channel client such as the channel client in FIG. 2.

FIG. 7 is a high-level flow chart of an alternate embodiment of a method of deploying software in which no temporary copy of the software is made on a channel client such as the channel client in FIG. 2. As shown in FIG. 7, the computerized method 700 comprises receiving instructions for distributing software to the one or more target computers (block 702) and creating at least one channel to distribute the software to the one or more target computers according to the instructions without creating a temporary copy of the software on the target computer (block 704). In one embodiment, the instructions comprise a schedule for distributing the software. In another embodiment, the instructions comprise a location for the software to be distributed.

Figure 8:
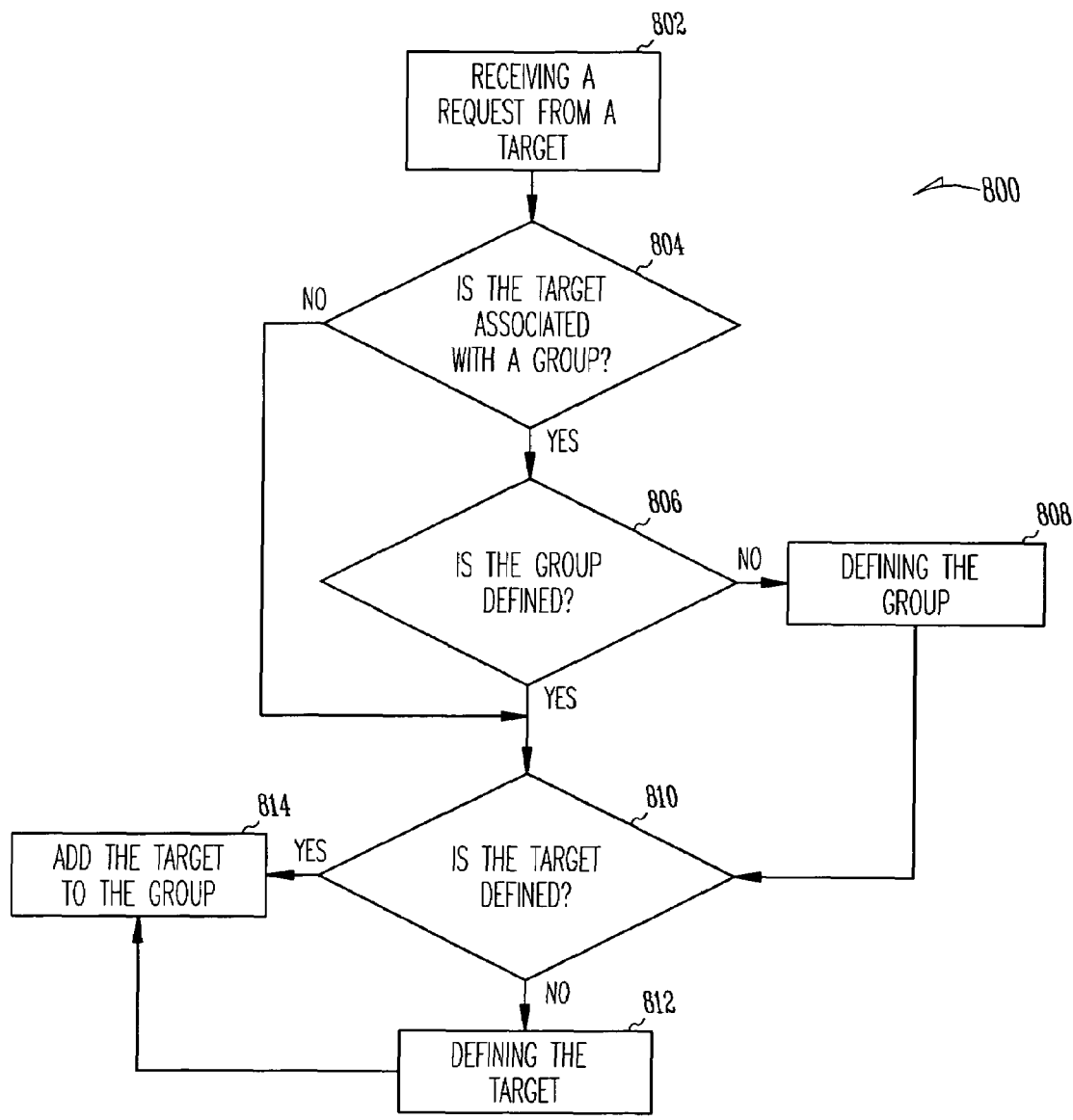
FIG. 8 is a high-level flow chart of an example embodiment of a computerized method of auto-populating a channel performed by a computer such as the channel server in FIG. 2.

FIG. 8 is an example embodiment of a computerized method of auto-populating a channel performed by a computer such as the channel server 204 in FIG. 2. As shown in FIG. 8, a channel server 204 receives a request from a target for one or more deployment instructions for a channel (block 802). The channel server 204 determines if the target is associated with one or more groups (block 804). If the target is associated with one or more groups, then the channel server 204 determines if the one or more groups are defined (block 806) and defines each one of the groups not already defined by the channel server 204 (block 808). The channel server 204 determines if the target is defined (block 810), and defines the target if the target is not defined by the channel server 204 (block 812). Finally, the channel server 204 adds the target to each one of the groups (block 814).

In one embodiment of the computerized method shown in FIG. 8, the one or more groups have a hierarchical relationship, and adding the target to each one of the groups is performed by adding the target to the top-most group. In another embodiment, determining if the target is associated with one or more groups is performed by analyzing the X.500 identification for the target. In still another embodiment, determining if the target is associated with one or more groups is performed by analyzing the Lightweight Directory Access Protocol (LDAP) identification for the target. In a further embodiment, the target is defined based on a channel client 206 environment variable setting.

In an alternate embodiment, a computerized method of auto-populating a channel is performed by computer executable instructions stored on a computer readable medium. The computer executable instructions perform a method. At least one channel to distribute the software to one or more targets is created. A request for software is received from one of the targets. The target is automatically added to the channel. Software is distributed to the target according to the channel. In one embodiment, the computerized method further comprises automatically adding the target to one or more groups. In another embodiment, automatically adding the target to one or more groups further comprises creating one or more groups. In another embodiment, the one or more groups are created based on one or more network containers defined as part of a directory services structure for the target. In an example embodiment, the directory services structure is Novell Directory Services or Microsoft Active Directory.

Figure 9:
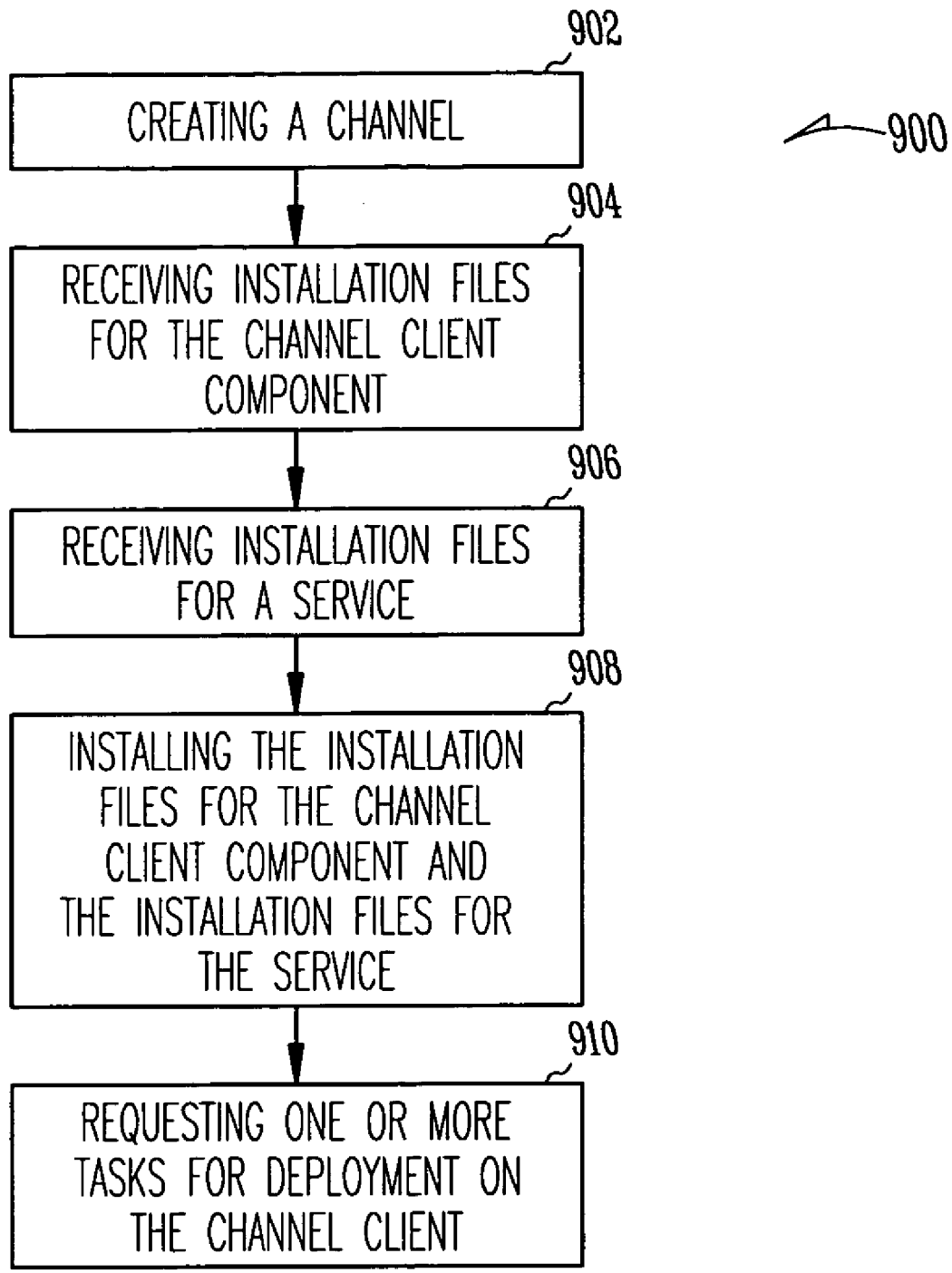
FIG. 9 is a high-level flow chart of an example embodiment of a computerized method of installing a channel client component on a target computer.

FIG. 9 is a block diagram of an example embodiment of a computerized method of installing a channel client component on a target computer. As shown in FIG. 9, the computerized method comprises creating, by a channel server 204, a channel comprising a list of one or more channel clients and one or more tasks assigned to each one of the channel clients (block 902). The method further comprises receiving, by each one of the target computers from the channel server 204, installation files for the channel client component (904). Installation files for a service are received by each one of the target computers from the channel server 204 (block 906). The installation files for the channel client component and the installation files for the service are installed at each of the target computers (block 908). Finally, the channel client 206 requests, from the channel server 204, one or more tasks for deployment on the channel client 206 (block 910).

In one embodiment of the method shown in FIG. 9, the target computer performs the actions of receiving installation files through a direct network connection with the channel server 204. In an alternate embodiment of the method shown in FIG. 9, the target computer performs the actions of receiving through a subscription file. In a further embodiment, the subscription file is received by e-mail, through a web page, through a login script, or the like. In another embodiment, the computerized method shown in FIG. 9 further comprises automatically contacting the channel server 204 by the channel client 206 to receive software for deployment.

Example embodiments of methods performed by a software distribution system according to example embodiments of the invention have been described by reference to a series of flowchart.

Example Implementation of the Software Distribution Systems and Methods

In this section of the detailed description, an example implementation of the invention is described that is part of a Prism Deploy product available from LANOVATION, the assignee of the present application. This section provides an overview of Prism Deploy and more detailed flow charts of the software distribution process according to an example embodiment of the invention.

The Prism Deploy Components comprise a Prism Deploy Editor, a Prism Deploy Console, a Prism Deploy Server, a Prism Deploy Client and a Conflict Checker. Prism Deploy's Editor is the user interface used to create and edit Prism files and standalone executables. The Prism Deploy Editor is installed on the administrator's computer and computers where Prism files will be built. The Prism Deploy Console uses Prism Deploy's Channel technology to distribute software, updates, and other changes to target computers and groups. The Prism Deploy Console is an example embodiment of a channel console component. The Prism Deploy Console is the interface used to manage software distributions. The Prism Deploy Console is used to:

create the channels that provide a structure for deploying software, populate the channel with target computers and groups, create tasks (Prism files, scripts, and commands) to be executed on target computers, and assign and schedule the tasks for deployment through the channel.

When the first channel is created with the Prism Deploy Console, the Prism Deploy Server is activated. The Prism Deploy Server is an example embodiment of a channel server component. The Prism Deploy Server hosts the underlying database, which stores information about channel objects. The Prism Deploy Client, which is installed on each target computer, communicates with the Prism Deploy Server and provides the vehicle for installing software and making other changes on a target computer. The Prism Deploy Client is an example embodiment of a channel client component. The Prism Deploy Client automatically contacts the Prism Deploy Server, ready to receive files, updates, or commands at any time. It also sends information to the Prism Deploy Server on the status of each new installation or change installed from the channel. The Prism Deploy Client also executes commands that are invoked via login scripts, batch files, third-party management suites and Prism Deploy's own shell extensions. These features let an administrator use a variety of methods for distributing Prism files to target computers. The Prism Deploy Client does not display an interface for users on the target computer; however, animated Prism Deploy icons appear in the computer's system tray:

When Prism Deploy is taking a Picture on a computer, the user sees the icon.

When Prism Deploy is finding changes, the user sees the icon.

When Prism Deploy is installing a Prism file on the computer, the user sees the icon.

An administrator can adjust individual settings for the Prism Deploy Client on each computer by using a subscription file, which is generated by the Prism Deploy Console, or by starting the Client directly from the target computer's hard drive. In one embodiment, individual users cannot manipulate settings via the Prism Deploy Client interface.

Prism Deploy's Conflict Checker is used to check for file and registry conflicts that may exist between two or more Prism files. Conflict Checker is not a required component for successful distribution of Prism Deploy files; however, it is a tool for preventing file version conflicts.

In one embodiment, Prism Deploy sets up and distributes incremental changes (such as a new word processing template or virus software update). Prism Deploy can also install a new application to every computer on a network and prepare a detailed report on the deployment. As one uses Prism Deploy:

Begin with the Prism Deploy Editor to create Prism files that contain the changes or software to distribute. Systems and methods for creating Prism files according to one embodiment of the invention are hereby incorporated by reference from the co-pending and co-assigned U.S. patent application Ser. No. 09/136,905, entitled SOFTWARE DISTRIBUTION, ERROR DETECTION AND REPAIR SYSTEM, filed Aug. 20, 1998.

If an administrator has created more than one Prism file, the administrator can use Conflict Checker to check for conflicts between Prism files before distributing the new file. Systems and methods for checking for conflicts between Prism files are hereby incorporated by reference from the co-pending and co-assigned U.S. patent application Ser. No. 09/137,405, entitled CONFLICT CHECKING USING CONFIGURATION IMAGES, filed Aug. 20, 1998.

Set up unique user channels in the Prism Deploy Console.

When the Prism file is ready for deployment, use the Prism Deploy Console for push distribution, either instantaneously or at a set time.

Use the Prism Deploy Web Expert to create a basic web page from which mobile or remote users can download new software, updates, and software repairs.

Figure 10A:
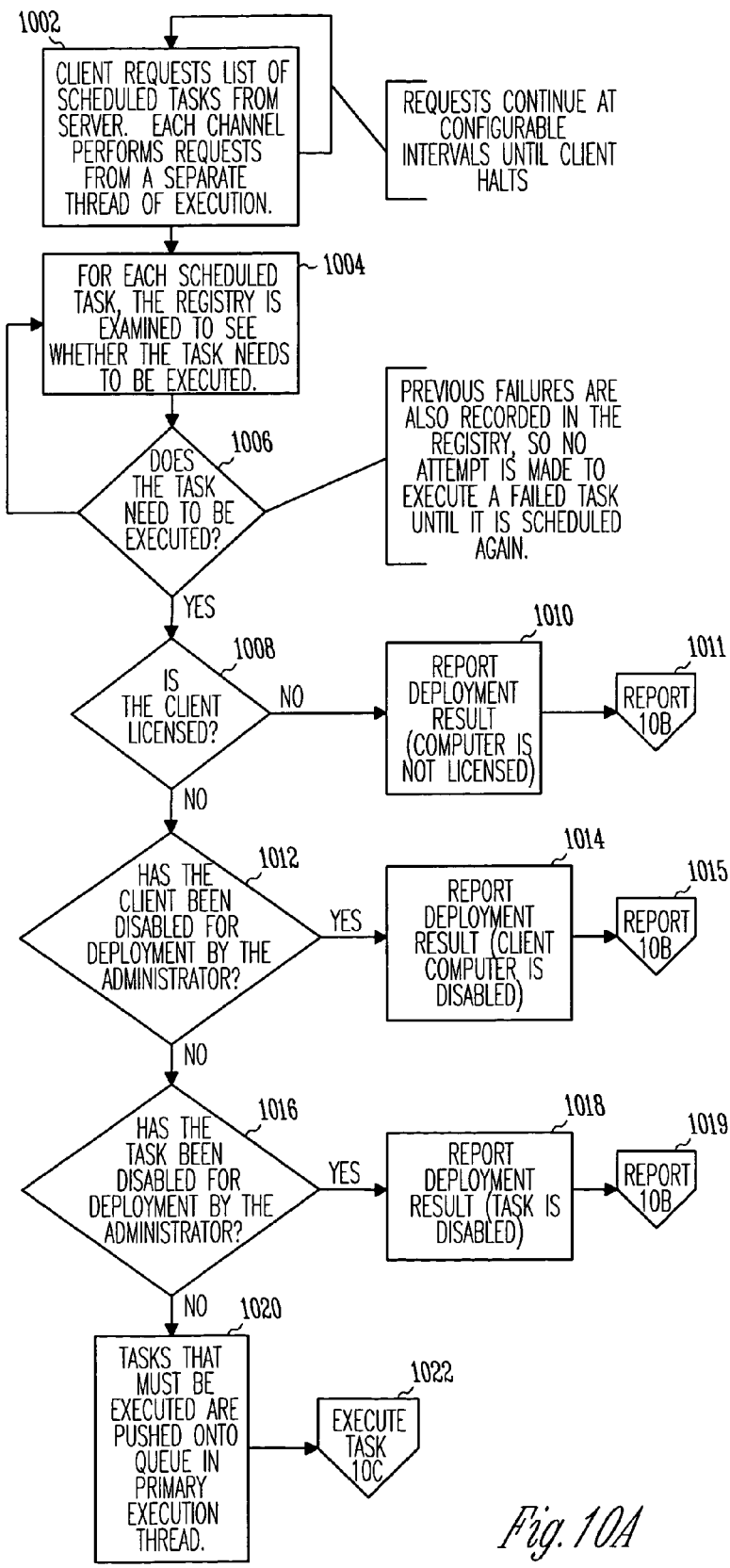
FIGS. 10A, 10B and 10C is a more detailed flow chart of an example embodiment of a computerized method of distributing software.
Figure 10B:
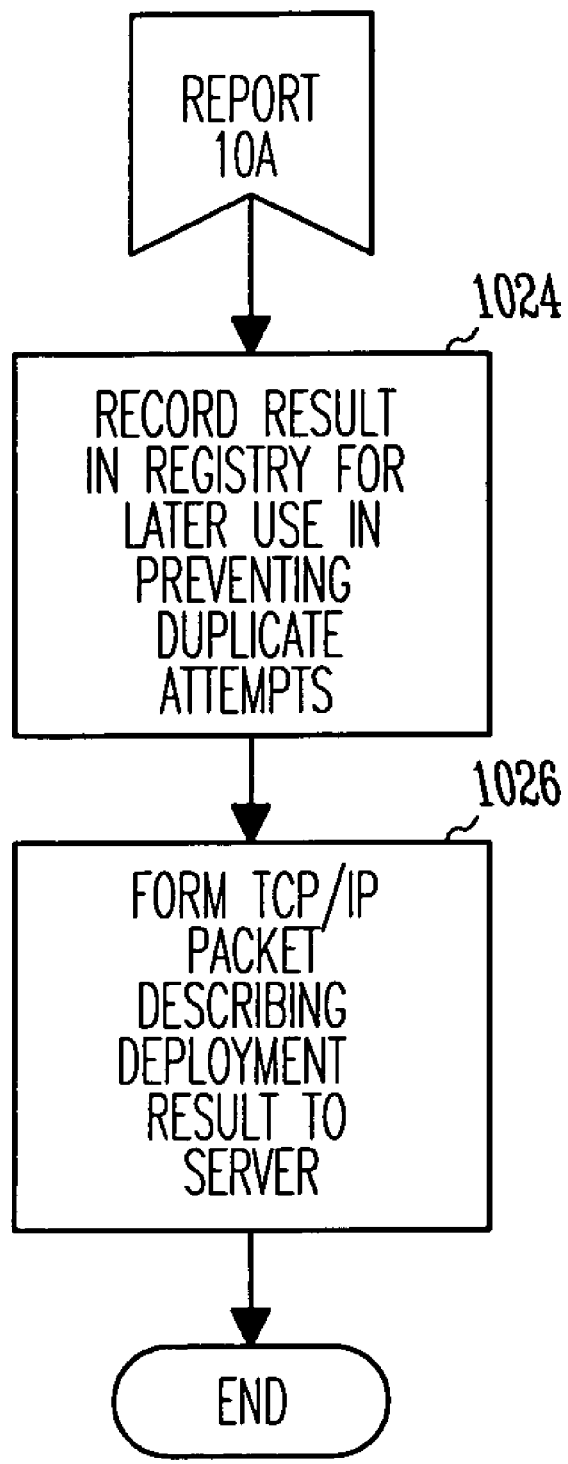
Figure 10C:
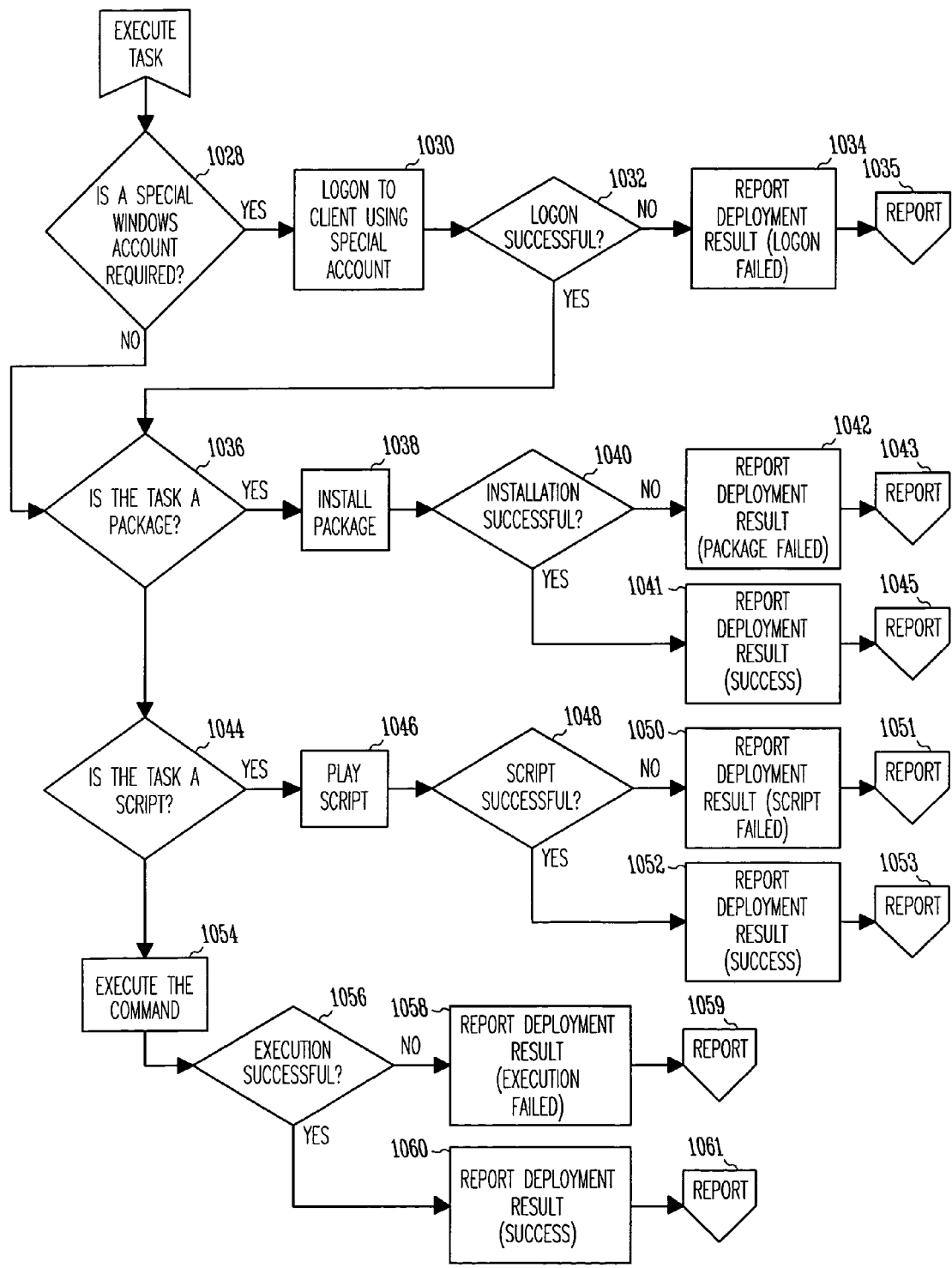

FIGS. 10A, 10B and 10C is a more detailed flow chart of an example embodiment of a computerized method of distributing software. As shown in FIG. 10, a channel client 206 requests a list of scheduled tasks from a channel server 204 (block 1002). In one embodiment, each channel performs requests from a separate thread of execution. For each scheduled task, the registry of the channel client 206 is examined to see whether the task needs to be executed (block 1004). If the task needs to be executed (block 1006), it is determined if the channel client 206 is licensed (block 1008). If the computer is not licensed, a deployment result is reported (block 1010). If the computer is licensed, it is determined if the channel client 206 has been disabled for deployment by an administrator (block 1012). If the channel client 206 is disabled, a deployment result is reported (block 1014). If the channel client 206 has not been disabled, it is determined if the task has been disabled by the administrator (block 1016). If the task has been disabled, a deployment result is reported (block 1018). The tasks that are to be executed are pushed into a queue in a primary execution thread (block 1020). In an example embodiment, the operation of reporting indicated at blocks 1011, 1015 and 1018 of FIG. 10A, and blocks 1035, 1043, 1045, 1051, 1053, 1059 and 1061 of FIG. 10C (described later) further comprise the operations shown in FIG. 10B. In an example embodiment, the operation of executing a task on a channel client 206 as indicated at block 1022 for FIG. 10A further comprises the operations shown in FIG. 10C.

FIG. 10B is a flow chart of an example embodiment of a method of reporting deployment results. As shown in FIG. 10B, the deployment result is recorded in the registry of the channel client 206 for later use in preventing duplicate deployment attempts (block 1024). A TCP/IP packet is created. The TCP/IP packet describes the deployment result to the channel server 204 (block 1026).

FIG. 10C is a flow chart of an example embodiment of a method of executing a task. As shown in FIG. 10C, it is first determined if a special Windows account is required to execute the task (block 1028). If a special Windows account is required, then the special account is used to log on to the channel client 206 (block 1030). If the logon is unsuccessful (block 1032), then a deployment report is created (block 1034). If the logon is successful (block 1032), then it is determined if the task to be executed is a package (block 1036).

If the task is a package, then the package is installed (block 1038). If the installation of the package is unsuccessful (block 1040), then a deployment report is created indicating that the installation of the package on the channel client 206 failed (block 1042). Otherwise, if the installation of the package is successful (block 1040), then a deployment report is created indicating that the installation of the package on the channel client 206 succeeded (block 1041).

If the task is a script (block 1044), then the script is played (block 1046). If the installation of the script is unsuccessful (block 1048), then a deployment report is created indicating that the installation of the script on the channel client 206 failed (block 1050). Otherwise, if the installation of the script is successful (block 1048), then a deployment report is created indicating that the installation of the script on the channel client 206 succeeded (block 1052).

In one embodiment, if the task is not a package or a script, then the task is a command to execute (block 1054). If the execution of the command is unsuccessful (block 1056), then a deployment report is created indicating that the execution of the command on the channel client 206 failed (block 1058). Otherwise, if the execution of the command is successful (block 1056), then a deployment report is created indicating that the execution of the command on the channel client 206 succeeded (block 1060).

FIG. 11 is a more detailed flow chart of an example embodiment of the computerized method of auto-populating a channel described by reference to FIG. 8 above. A target contacts the channel server 204 for deployment instructions (block 1102). The target identifies itself by name, and the channel server 204 differentiates targets based on name (block 1104). The target's name is parsed (block 1106). If the target's name is in X.500 or LDAP format, then the target's name is split into a "root" name and a hierarchical list of groups to which the target belongs (block 1108). For each group found in the target's name the actions in blocks 1112-1120 are performed (block 1110). The group is checked to see if it is already defined by the channel server 204 (block 1112). If the group is not defined by the channel server 204, then the channel server 204 determines whether or not automatic population of groups is allowed (block 1114). If automatic population of groups is allowed, then the group is added to the channel server 204 (block 1116). The target's name is checked to determine if there is another group following this one in the target's name (block 1118). If there is another group in the target's name, the group added to the channel server 204 at block 1116 is identified as a parent of the next group (block 1120). The actions in blocks 1112-1120 are repeated (block 1110) until all of the groups in the target's name are processed (block 1118). Then the most recent group added to the channel server 204 at block 1116 (the current group) is identified as the group to which the target will belong (block 1122).

The channel server 204 determines if a target with the specified root name is already defined (block 1124). If the target is not defined, the channel server 204 determines if automatic population of targets is allowed (block 1126). If automatic population of targets is not allowed, then automatic distribution of software to the target is not allowed (block 1128). However, if automatic population of targets is allowed, then a definition for the target is added to the channel server 204 (block 1130). The target is automatically added to the group. In one embodiment, if the target belongs to multiple groups, the target is added to the top-most group in the hierarchy (block 1132). After the target is added to a group, the target receives deployment instructions from the channel server 204 (block 1134).

Returning to block 1106 of FIG. 11, if the target's name is not in X.500 or LDAP format, then the target's name is the same as its root name (block 1107). If the target's name is the same as its root name, the operations to add groups and sub-groups to the channel server 204 are skipped (blocks 1108-1122) and the channel server 204 determines if a target with the specified root name is already defined (block 1124). If the target is already defined and the target does not specify a group (block 1132), the target receives deployment instructions from the channel server 204 (block 1134).

Figure 12A:
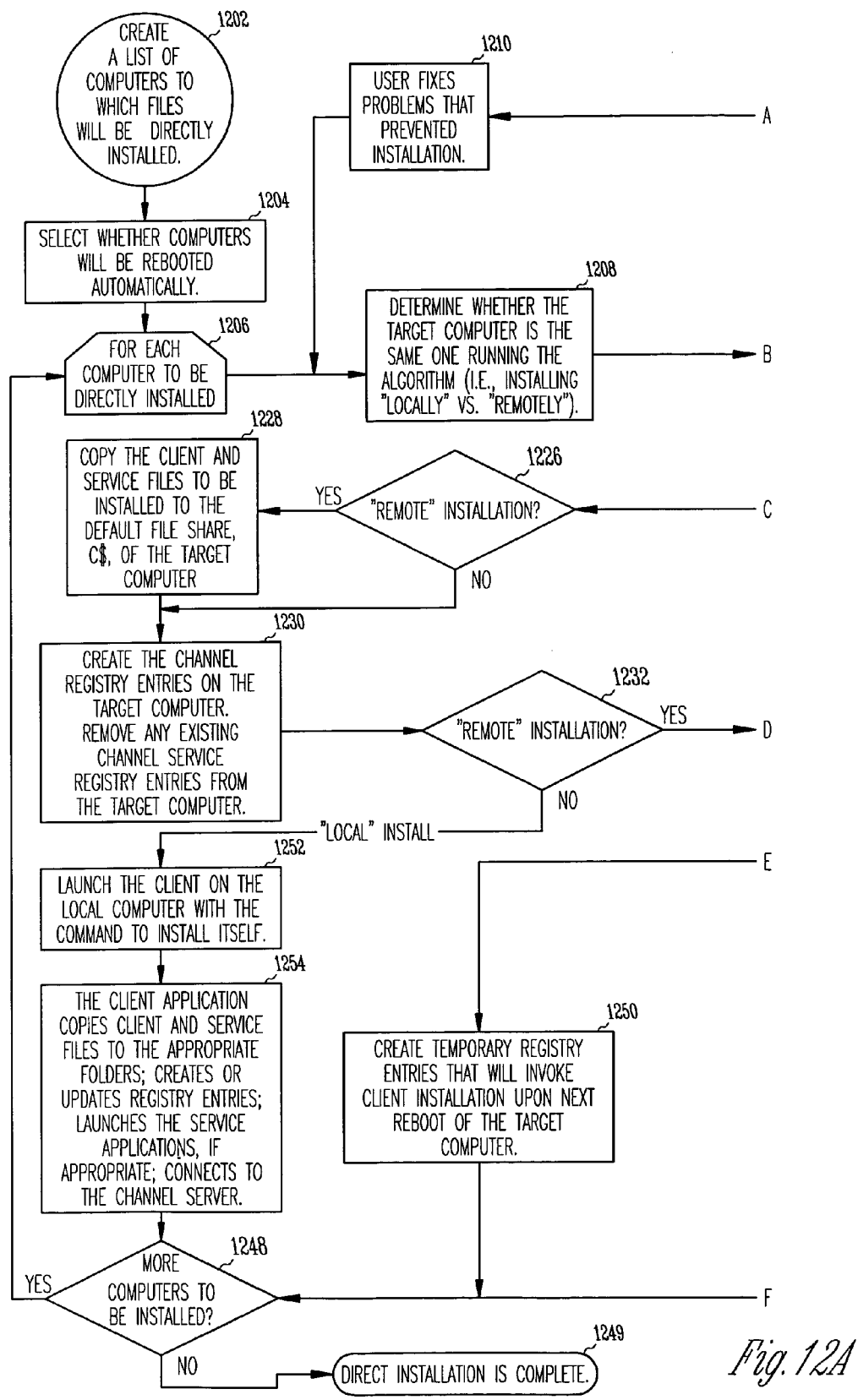
FIG. 12 is a more detailed flow chart of an example embodiment of a method of directly installing the channel client component software on a target computer that is directly connected to a network.
Figure 12B:
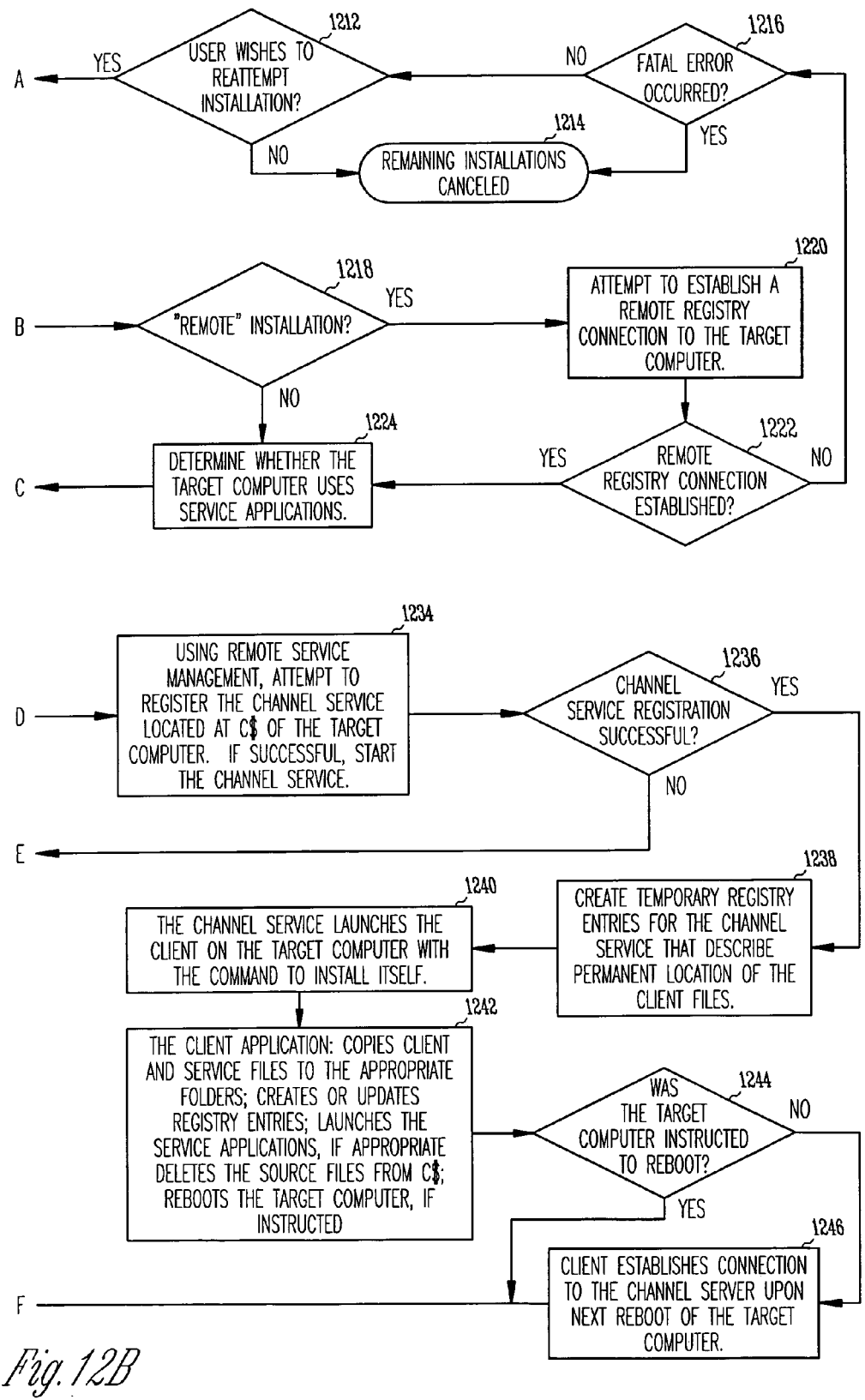

FIG. 12 is a more detailed flow chart of an example embodiment of a method of directly installing the channel client component software on a computer that is directly connected to a network. In one embodiment, the method shown in FIG. 12 is initiated by a channel console to install the channel client component software on a target computer. However, in an alternate embodiment, the channel server initiates the method. In one embodiment, the channel console creates a list of computers to which files will be directly installed (block 1202) and selects whether the computers will be rebooted automatically (block 1204). For each computer to be directly installed (block 1206), it is determined whether the target computer is the same one running the algorithm (i.e. installing "locally" vs. "remotely") (block 1218). If the installation is remote (block 1218), the channel console attempts to establish a remote registry connection to the target computer (block 1220). If the registry connection is not established (block 1222), then determine if a fatal error occurred (block 1216). If a fatal error has occurred (block 1216), cancel the remaining installation instructions (block 1214). If a fatal error has not occurred (block 1216), then determine if the user wishes to reattempt the installation instructions (block 1212). If the user wishes to reattempt the installation, the user fixes the problems that prevented the installation (block 1210). If a remote registry connection is established (block 1222), then it is determined whether the target computer uses service applications (block 1224). For a remote installation (block 1226), copy the client and the service files to be installed to the default file share, C$, of the target computer (block 1228). If it is not a remote installation (block 1226), create the channel registry entries on the target computer. Remove any existing channel service registry entries from the target computer (block 1230). Then, for a remote installation (block 1232), using remote service management, attempt to register the channel service located at C$ of the target computer. If successful, start the channel service (block 1234). If the channel service registration is successful (block 1236), create temporary registry entries for the channel service that describe permanent locations of the client files (block 1238). The channel service launches the client on the target computer with the command to install itself (block 1240). The client application copies client and service files to the appropriate folders, creates or updates registry entries, launches the service applications, if appropriate, then deletes the source files from C$ and reboots the target computer if instructed (block 1242). If the target computer was not instructed to reboot (block 1244), the client establishes a connection to the channel server upon next reboot of the target computer (block 1246). If the target computer was instructed to reboot (block 1244), then it is determined if more computers are to be installed (block 1248). If no more computers are to be installed (block 1248), then the direct installation is complete (block 1249). Returning back to block 1236, if the channel service registration was not successful, then a temporary registry entry is created that will invoke client installation upon next reboot of the target computer (block 1250). Returning now to block 1232, if the installation is local, then the client on the local computer is launched with the command to install itself (block 1252). The client application then copies client and service files to the appropriate folders, creates or updates registry entries, launches the service applications, if appropriate, and connects to the channel server (block 1254). If no more computers are to be installed (block 1248), then the direct installation is complete (block 1249).

Figure 13:
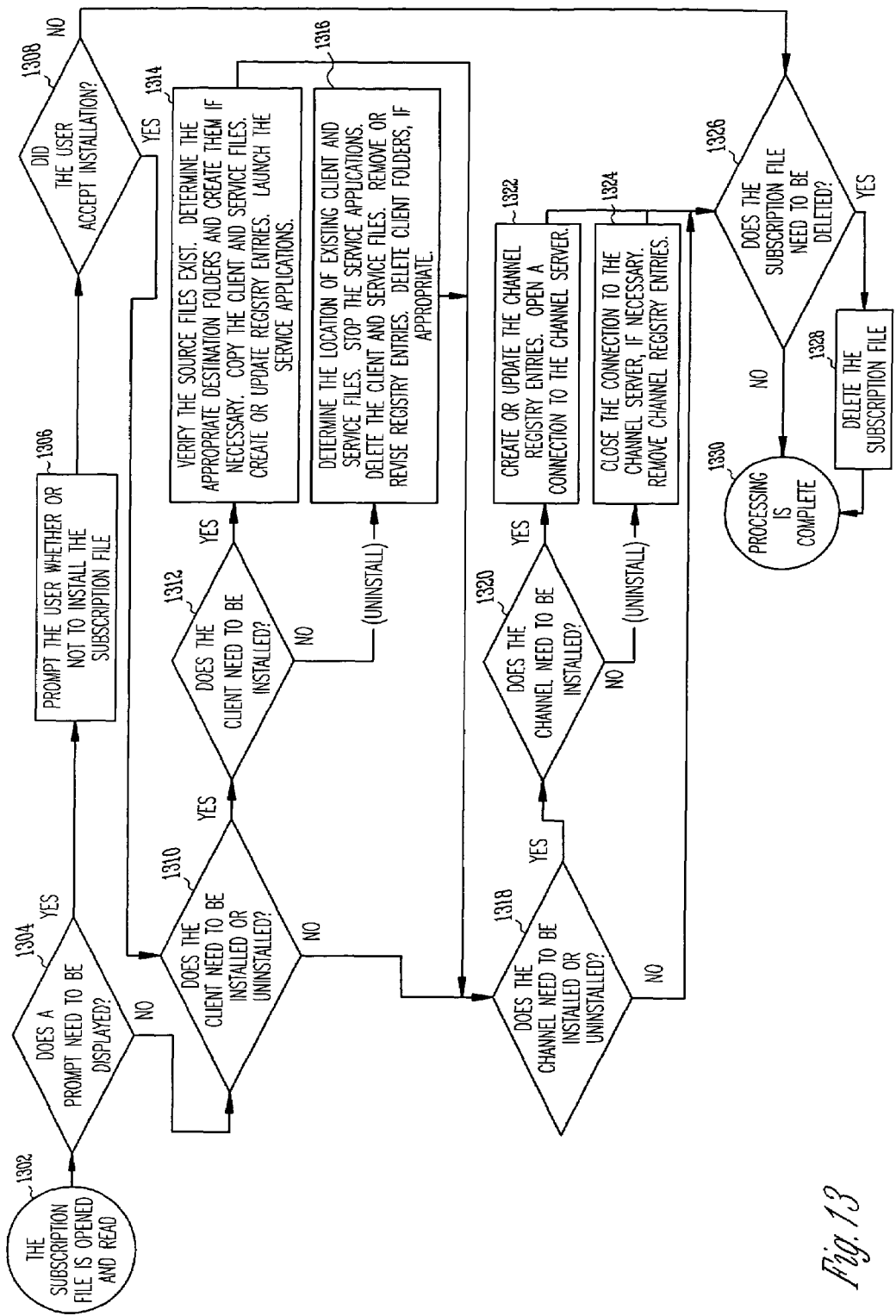
FIG. 13 is a more detailed flow chart of an example embodiment of a method of installing the channel client component software on a target computer that is not directly connected to a network.

FIG. 13 is a more detailed flow chart of an example embodiment of a method of installing the channel client component software on a target computer that is not directly connected to a network. In the example embodiment shown in FIG. 13, subscription files are used. In one embodiment, the subscription files are authored by a channel console and read by channel client. However, in alternate embodiments, the channel server authors subscription files. As shown in FIG. 13, the subscription file is opened and read by a channel client (block 1302). It is determined whether or not a prompt needs to be displayed (block 1304) and, if yes, then the user is prompted regarding whether or not to install the subscription file (block 1306). If the user accepts the installation of the subscription file (block 1308), then it is determined whether or not the client needs to be installed or uninstalled (block 1310). If the client needs to be installed (block 1312), it is verified that the source file for the installation exists (block 1314). To install the client, the appropriate destination folders are determined and created if necessary, the client and service files are copied, registry entries are updated or created, and the service application is launched (block 1314). If the client is to be uninstalled (block 1312), the location of the existing client and service files are determined, the service applications are stopped, the client and service files are deleted, the registry entries are removed or revised, and client folders are deleted if appropriate (block 1316). The channel client then determines if the channel needs to be installed or uninstalled (block 1318). If the channel needs to be installed (block 1320), the channel registry entries are created or updated, and a connection to the channel server is opened (block 1322). If the channel needs to be uninstalled (block 1320), the connection to the channel server is closed and, if necessary, the channel registry entries are removed (block 1324). Then, the channel client determines if the subscription file needs to be deleted (block 1326). If yes, then the subscription file is deleted (block 1328) and the method is completed (block 1330).

ALTERNATE EMBODIMENTS AND FURTHER DEFINITIONS

User. A user is a concept distinct from the concept of a computer for several reasons:

It may be desirable to assign a task to a user regardless of which computer(s) they are using.

In a network environment, a user may use more than one computer. By allowing a task to be assigned to a user, the same task can automatically execute on all the appropriate computers.

A user can change computers. By assigning tasks to the user rather than a computer, their tasks can automatically execute when they begin using a new computer.

Software contains elements that are available to some users of a single computer but not others, for instance a shortcut to an application that resides on the computer's "desktop." By allowing a task to be assigned to a user rather than a computer, those elements can be provided to the desired users but not others.

It is also possible to assign a task to a user only on a specified single computer, meaning that the task will execute on a computer only when the specified user is using it, and not on any other computers that same user might use.

Container. Where administrators are assigning tasks to large numbers of computers or users, it is unwieldy to provide names to the computers and users in such a way that they are both unique and easily recognized. Furthermore, there is often a need in such environments to group computers and/or users into functionally similar units. Finally, the method for naming computers and users preferred by administrators will frequently be the same as their network-specific identification. Since both the NetWare and Windows 2000 network operating systems use the X.500 or LDAP specifications to name the network objects corresponding to users and computers, channels support the same.

Where a user name is "JConrad.Marketing.Acme.US," the user "JConrad" belongs to the container "Marketing," which in turn belongs to the container "Acme," which in turn belongs to the container "US." This convention makes it possible to have a user with the name "JConrad.Sales.Acme.US" and avoid name conflicts as well as organize the objects more efficiently.

A task can be assigned to any container, automatically assigning it to all the computers and users within it. Also, a task can optionally be assigned to a container in such a way that it is automatically assigned to the containers it in turn contains. In our example assigning a task to "Acme.US" would optionally assign it to all the computers and users in both "Sales" and "Marketing" as well.

A computer or user can only belong to one container. A task can also belong to a container for the same reason a computer, user, or group can.

Group. It is frequently useful to be able to group and arrange computers and users in groups. This makes it possible to assign tasks to large numbers of computers and/or users with similar requirements or environments in a single step. Tasks can be assigned to groups, and groups can belong to containers (thus inheriting the tasks assigned to the containers), but groups cannot contain other groups.

License. A license object defines a block of license numbers to be assigned to computers. This block is available as a binary, encrypted file available only from Lanovation. It will typically be available on a diskette accompanying the CD; it could also be e-mailed to customers. License objects can either be "purchased" or "evaluation" licenses. Evaluation licenses allow the administrator to test and evaluate the software, and expire after a certain interval of time, after which they need to be replaced with a purchased equivalent. The evaluation version of the program will come with an evaluation license object allowing a certain number of computers to be initially licensed.

Licenses are applied to computers, not users. This means that if an administrator has a single computer used by 3 users only one license is needed. If, however, they have a single user who logs on to three different computers, three separate licenses are required.

Naming Conventions. While computers and users are identified by an alphanumeric name within the channel console 202, there are actually many possible methods for the channel client 206 to find the channel objects corresponding to the current user and computer (and thus determine which tasks need to be executed). The method employed by the channel client 206 is to perform an alphanumeric lookup of the names as defined by the operating system (configurable by the administrator as described below) against the names defined by the objects in the database (though in this case it is actually the channel server 204 that performs the lookup). This has the important ramification that when a computer or user's name changes, the list of tasks assigned them also changes. It also means that the administrator must ensure that computer and user names are unique. It has the distinct advantage, however, of putting the administrator in firm control over the relationship of channel objects and actual users and computers. Installing software on a newly cloned computer, for instance, becomes automatic. The client runs, determines its identify based on its name, and then finds the tasks assigned it and executes them, since the fact that they have previously been executed has been erased by the cloning operation.

Where the computer or user name contains one or more periods, it is automatically assumed that the periods delimit the container hierarchy containing the computer or user.

Channels themselves are named using one of three methods:

COMPUTER\CHANNELNAME
IP-ADDRESS\CHANNELNAME
URL\CHANNELNAME

Examples are "SERVER\Acme Software," "125.207.1.1\Channel1," and HTTP://WWW.ACME.COM\CHANNEL1. The client uses the portion of the name before the back-slash character to determine the computer to which channel requests are to be directed using TCP/IP. The portion of the name after the back-slash character is an identifier used in all channel communications to distinguish channels where more than one is active on a single computer.

There is nothing about a channel that is tied to a specific computer. However, when a channel is moved, two steps must be taken:

The channel server 204 must be installed on the new computer, and the channel server 204 on the previous computer must stop using the channel. Both of these actions are performed via the console.

The clients are told to change the channel name. The mechanism for doing this has not yet been defined.

Variables. As stated above, the operating system is asked to supply the computer and user names used to find the appropriate objects in the channel database. The channel client 206, however, optionally provides fine control over this operation via the use of environment variables. A channel can define a list of variables to be defined at each workstation. Like the variables defined within a configuration image file, these variables can be based on a default value, another variable, or an INI-file or registry value. Also like the variables in configuration image files, these variables can be "per-user" variables, meaning that they are resolved separately as each user logs on, or "per-computer" variables, meaning that they are resolved once and only once each time the computer starts.

In addition, the administrator of a channel can optionally provide a custom DLL file with predefined entry-points for creating or changing environment variables when the computer starts and when users log on.

As its first step the client resolves the requested "per-computer" variables and calls the custom functions. It then looks for the value of a predefined "PT_COMPUTER" variable to determine the computer's name. Given the support for administrator-defined variables, this could now be anything the administrator wants it to be. If the "PT_COMPUTER" variable has not been defined, the client gives it the computer name as reported by the operating system. In either case, it is this name that is used to identify the computer. Finally, the current list of environment variables and values is transmitted to the channel server 204 for storage in the database.

As each user logs on, the steps described above are repeated, but this time using the "per-user" variables. The client maintains an internal list of the variables known to be per-user variables. All variables not explicitly defined by the administrator as "per-user" variables and not members of this internal list are considered "per-computer" variables. The special variable "PT_USER" is used for the user's identification, once again populated with the operating system's definition of the current user where no existing value is found. Note that the "PT_USER" and "PT_COMPUTER" variables will be presented to the administrator within the console application as much friendlier constructs; only advanced administrators will need to be explicitly aware of this convention. Once the variables have been resolved, the current user's tasks are executed and the list of per-user variables is transmitted to the channel server 204 for storage in the database.

The list of variables for either a computer or user is available in the channel console 202 for viewing as one of the object's properties.

This use of variables provides a highly flexible method for defining computers and users in almost any environment. On the smaller end of the scale, small to medium-sized organizations (and test labs at large organizations) will be able to use the existing logic without modification. Larger organizations, or those with complex environments such as multiple network operating systems, will find it easy to configure a channel in the manner that best suits them. A computer manufacturer could even use the environment variables or the custom DLL feature to map users with their customer database using serial numbers or the like. There are likely to be even more uses for such variables not described by this document.

Automatic Groups. As described above, the channel console 202 makes it possible to create "groups," collections of computers and/or users that are to be assigned the same tasks. The console also makes it possible to create "automatic groups" based on the value of variables as described in the previous section. For instance, an administrator can tell the console to create one group based on a particular value of a variable, another group based on another value for the same variable, and yet a third group based on all other values. When a computer or user contacts the channel server 204 with its list of variables as described above, it is immediately moved within the set of automatic groups for a variable to the one matching the variable's current value. All the tasks assigned to that group are then automatically assigned to the computer or user. Further, these groups within the console now represent a visual inventory tool, able to group computers and users by any arbitrary means that can be defined by a variable.

As an example, say an administrator wants to know which computers have the "Sound Blaster" sound card installed. A set of automatic groups is defined for the environment variable "BLASTER," which is assumed to be defined when a Sound Blaster card is present. One group is based on the variable's value existing, and the other group is based on it not being defined. Now the administrator not only has an excellent means for determining which computers have sound blasters and which don't, he or she is able to selectively distribute updates to the Sound Blaster users without a great deal of effort.

Another example: Let's say that a computer manufacturer makes a certain brand of hard disk that requires some kind of software update some time after many models have been sold. The manufacturer provides a custom DLL that examines the hard disk when the client starts and sets a variable based on the identity of the hard disk. Now it becomes straightforward for the manufacturer to provide the updates only where appropriate.

The console also supports the creation of automatic groups using comparison operators. An automatic group could easily be "all computers where the 'CURRENT_REVISION' variable is less than 5."

Licensing. To enforce its licensing in the most thorough manner possible, the client checks license objects in two different ways.

When the client begins communications with a channel via the channel server 204, it checks for its associated license object. Since each license object actually defines a list of licenses, the client also receives an ordinal index relative to that license object. The channel server 204 ensures that no two computers on the same channel are using the same license.

When communicating with the next channel in its list, the client also tells the channel server 204 the license information from the previous channels, and asks it to verify that the licenses from those previous channels are not being used by any computers in the current channel.

This two-way check ensures that licenses cannot be duplicated in any environment where all channels are available to all clients. It is possible, however, for an administrator to set up a scheme in which a set of clients uses one channel and other clients use a different channel, with licenses duplicated across the two channels. This situation will often be very clumsy for the administrator to maintain, and it will not be addressed.

Licenses can only be obtained from Lanovation. They are distributed in relatively small increments, typically 10 counts, so that it is easy to use them in multi-channel environments. They can be added to or removed from a channel using the console. When this occurs existing assignments of licenses and computers are automatically rearranged. It is not possible to remove licenses that are in use.

Security. The advantages of TCP/IP as the channel transport mechanism have been discussed above. There is, however, one disadvantage. Because no network permissions come into play, the channel server 204 has no native mechanism for determining which users are actually administrators and should be allowed to view or edit the channel database.

To solve this problem, the channel database will maintain a list of user names and passwords. When running the channel console 202 for a channel, the user (potentially the administrator) will need to enter a user name and password that match an entry in the list to ensure access. This will allow the database to be viewed but not edited. Some users will be defined as "administrators," who can also edit the database (by creating and assigning objects, say) and modify the contents of the user-password list themselves. The binary file containing the user-password list is encrypted with the globally unique identifier for the channel, and this number is checked when the file is decrypted. This prevents security breaches and also potentially allows Lanovation support, in the event of an administrator forgetting a key password, to provide a default user name and password for an administrator without impacting other channels.

Auto-Population. By default, channels allow automatic population of objects. This means that when a new computer subscribes to a channel, or a user not in the database logs on, the following events occur without intervention:

The computer or user is added to the database.

If it is a computer and a license is available, the computer is automatically licensed.

If the computer is currently assigned to an evaluation license and a purchased license is available, the computer is reassigned to the purchased license.

If the computer is licensed, the appropriate tasks are automatically executed.

All of this behavior can be defeated in the console by changing the channels' settings.

This makes it effortless to build a new channel's database without the need for a great deal of data entry. It also makes it very easy to add new computers or users to an existing channel.

Push vs. Pull. The administrator of a channel will also have the option of providing tasks on a hierarchy of web pages. This will allow the user to choose which tasks they want to execute. In much the same manner as the web expert available in previous versions of PictureTaker, the new version will ask the administrator to provide a template for a page that is to contain a link to the task. The user will then be able to browse these web pages and select the desired tasks. The only requirement for these web pages is that they be published to a folder accessible to all desired users.

The client will modify local copies of the web-page templates provided by the console so that they contain only the tasks assigned to the client. It will then make these web pages available within the "Favorites" folder in much the same way as the operating system itself often includes a "Software updates" link within this folder. There may be other mechanisms for accomplishing this is as well, for example shortcuts or Windows tasks (not channel tasks) registered and scheduled with the operating system.

When a channel is first created, a special folder can optionally be created containing all the files and information necessary to install the channel console 202, install the channel client 206, and subscribe to the channel. Two HTML documents will reside in this folder; one will allow administration using the web-browser component of the channel console 202, installing the console as a first step if necessary. A second will be a page for distribution to users; the user can then click on a link to this file they receive as an e-mail attachment or as part of another web page to immediately subscribe. The client will be installed, if necessary, and then will subscribe to the given channel (assuming there are no Windows policies or permissions that prohibit this).

Using web pages as a delivery and installation mechanism makes the channel an excellent vehicle for distributing software using both "push" and "pull" mechanisms and for reducing the effort involved in deploying the channel itself.

Scheduling. The console provides the ability to schedule the execution of a task. Similar options to the existing command-line interface are provided:

Once. Execute the task only if it hasn't previously been executed. This is the default scheduling option.

Update. Execute the task if it hasn't previously been executed or the task's configuration image file (if any) has been updated since the last time it was executed.

Schedule. Provide a time and date for executing the task. Execute the task if the current time and date are after the specified time and date and the task has not been executed since the specified time and date.

Always. Execute the task every time the computer starts or the user logs on, depending on whether the task has been assigned to the computer or user.

In addition, there are several enhancements to the scheduling of a task via a channel as opposed to the command-line interface:

Define a schedule for an object that is assigned a task indirectly. For instance, if a task is assigned to the container "Engineers," the task's schedule can be defined specifically for "Martha.Engineers" even though the task has not been assigned directly to Martha.

Specify that a task is only to be deployed at certain hours, dates, and/or days of the week.

Define a "scheduled" task (the third of the four options described above) that also automatically boots the target computer at the specified time if the computer's network interface card supports such an action. The computer is booted, the scheduled task is executed, and the computer shuts down again. This option is only available for a computer object, not a user object.

Specify that a task be published on a web page. The administrator provides a web-page template and a section within that template for the task. The client will then modify a local copy of the specified web pages so that they contain only the tasks assigned the client. Combined with the other scheduling options and channel features, administrators thus have the ability to provide web-based installations and updates automatically tailored to a computer or user's environment, using both "push" and "pull" methods.

File Locations. There are almost always one or more files associated with a channel task. Most commonly, there is a single configuration image file that needs to be installed when the task is executed.

When an administrator defines the configuration image file to be associated with a task, by default the file will not be copied to a new location; the channel server 204 will verify that it can access the file-name provided in its present location. If it cannot access it, the administrator will be asked to put the file in a location always accessible to the channel server 204. While imposing some design work on the administrator, this approach makes it possible for bandwidth concerns to be addressed and network architectures to change without the need to change the channels themselves. It also means that the files associated with a task can be updated or altered without always having to update the task itself.

The channel server 204 can also be configured to update the file it uses for tasks from a central location. This means that a large organization can automate the distribution of a single large file from a central location to one or more sub-networks.

Automatic Installation and Updates. As described above, when a channel is created, a link is automatically made available for subscribing to the channel and installing the client if it is not already installed. When the console is installed on a computer, an installation shell extension is installed with it. This shell extension allows the administrator to install the client by making a selection from the context menu associated with a computer in the operating system's "Network Neighborhood" area (this area has different names in the different versions of Windows) or in the network management area of Windows 2000.

There will also be a command-line available for installing the client, similar to previous versions' "/Install" command. Coupled with the auto-population feature described above, the availability of several approaches to rolling out the client on first usage will remove a serious impediment to the evaluator or first-time administrator.

The channel server 204 stores in the channel database 210 all the files needed for the channel client 206 and channel console 202 to execute. Every time the client contacts the channel server 204, a check is made to ensure the client has the latest files. If it does not, the updated files are copied to the client, which then resumes execution without the need for a reboot. Similarly, every time a console contacts the channel server 204, it ensures the server has the latest versions of the same files, that the server itself is up to date, and that the console is up to date. When Prism Deploy is installed the latest files for the client, server, and console are automatically installed locally along with everything else. Thus once the original media or files directly from Lanovation are installed, all other components are automatically updated using the channel itself.

The updates described above only occur after the versions of the appropriate applications have been checked and found to be out of date, and it has been verified via electronic signature that the files indeed originate from Lanovation.

Managed vs. Unmanaged Channels. For computer manufacturers, the licensing algorithm used by the channels may be unwieldy to implement given the large number of potential users. For this reason a distinction is made between "managed" and "unmanaged" channels. A "managed" channel is as described above, where the administrator works with blocks of licenses obtained directly from Lanovation. An "unmanaged" channel, however, does not perform any license checking on its clients. Instead, it contains a "certificate" from Lanovation. This certificate is in the form of an encrypted binary file, available only from Lanovation, that identifies the vendor by name. Once this certificate has been installed, license checking ceases and any number of clients can use the channel. Neither the evaluation nor purchased version of Prism Deploy will allow the implementation of an unmanaged channel by supplying this certificate; only by reaching a separate agreement with Lanovation can the vendor receive the certificate and begin publishing unmanaged channels.

Certificates are subject to the same two-way checking as licenses; they cannot be shared across multiple channels.

The Channel Client. The following is a step-by-step description of the actions carried out according to one embodiment of the invention by the channel client application when a computer is booted and later a user logs on to it.

1. The bootstrap program runs and launches the client application.
2. The client examines the list of channels it subscribes to. If there are no channels, it terminates.
3. If there is one or more subscribed channels, the client attempts using the first available TCP/IP connection to connect with the first channel. If the connection is a dial-up one, non-dial-up connections are also attempted.

4. If a connection cannot be made with the channel, the client goes into a silent wait mode for that channel; when a connection becomes available, it resumes again with the next step.
5. For each channel, the client checks its present executable version against that reported by the Channel server 204. If there is an update available, the files are updated to a predetermined location, the client terminates, the bootstrap program replaces the files, and the client is launched again, effectively resuming where it left off.
6. The client requests and receives a list of "per-computer" variables and/or custom DLLs from the channel server 204. Existing custom DLLs are stored locally and version-checked, so they are not downloaded every session.
7. The computer's variables are resolved, the custom DLL, if any, is called, and finally the channel's "per-computer" variables are resolved. The complete list of variables is transmitted to the channel server 204.
8. Based on the PT_COMPUTER variable, the channel identifies itself to the channel server 204.
9. If the computer does not yet exist in the channel and the appropriate auto-population setting is enabled, the computer is added to the database.
10. If the computer is not yet licensed and the appropriate auto-population setting is enabled, the computer is licensed.
11. The computer checks any licenses it has from other channels with the channel server 204 to ensure they are not in use by any objects in the channel database.
12. If the computer is not in the database or a licensing error has occurred, the error is reported to the channel server 204 and the channel is disconnected. Otherwise, the client continues to the next step.
13. The computer requests and receives a list of tasks assigned to it from the channel server 204. Each task is accompanied by its schedule for that computer.
14. The computer checks each task to see if it needs to be executed based on its schedule and previous installation history as defined in the local registry. If appropriate, the task is executed. Whether or not the task executes, the action taken or execution result is reported to the channel server 204 for storage in the database.
15. The computer remains passively "listening" for further instructions from the channel server 204 or for a user to log on.
16. The client repeats the previous steps for each channel.
17. When a user logs on, the client executable in the user's "Startup" folder executes and initiates two-way communications with the client executable that launched when the computer started. It resolves the "per-user" variables, which are transmitted to the channel server 204. This time there is no licensing logic invoked, but the user is added to the channel database if it did not previously exist and the appropriate auto-population setting is enabled.
18. If the user exists in the database and the computer is licensed, the tasks assigned to the current user are checked against their schedule in the same manner as the computer's tasks and executed if appropriate. In this case the client program launched from the "Startup" folder actually performs the installation.
19. The client rebuilds the appropriate hierarchy of web folders to reflect any tasks assigned the computer or user using the "pull" method.
20. When the user logs off, the client component launched from the "Startup" menu ceases, but the first component continues execution, waiting for further tasks or the next user to log on.

In short, channels give an administrator finer control than previous systems in terms of identifying users and computers, customizing deployments and scheduling deployments. In some embodiments, multiple channels coexist on the same network, and both "push" and "pull" distributions are provided.

Channels inhibit piracy. In one embodiment, each computer needs a valid license. Two different computers that have access to the same channels are prohibited from making use of the same license.

Channels provide both fine and coarse details on the results of distributions, in formats suitable for importing to analysis tools or databases. In one embodiment, these results are available immediately after a distribution is attempted.

Channels can be used in widely diverse environments. For example, a channel can be used in as broad an environment as a large computer manufacturer providing software updates to its customers, or in as small an environment as a college computer lab where a single technician needs to automate the configuration of the lab's computers.

Other mechanisms for distributing software will be apparent to those skilled in the art. For example, in one embodiment, channels are used in any environment that uses the Microsoft Windows operating system and the TCP/IP network protocol. However, embodiments of the systems and methods of the invention are not limited to use with the Microsoft Windows operating system and the TCP/IP network protocol. Furthermore, the network servers used do not have to use the Windows operating system.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

What is claimed is:

1. A system comprising:
one or more distribution servers used to install client software on a plurality of client computers and to subsequently use the client software to perform tasks later assigned to one or more of the plurality of client computers by at least one of the distribution servers;
at least one computer program operative on the one or more distribution servers to communicate with the plurality of client computers to initiate an installation of the client software on the client computers, wherein the installation on a particular computer of the plurality of client computers comprises:
  i) distributing a client software component installation file to the particular client computer;
  ii) distributing a client service installation file to the particular client computer; and
  iii) from at least one of the distribution servers, remotely causing the client software component installation file and the client service installation file to be used to install a client software component and a client service, respectively,
wherein the client software component and the client service are associated with one another when installed on the particular client computer, and
wherein the client software component and the client service are subsequently used by the particular client computer to perform at least in part one or more tasks assigned to the particular client computer by at least one of the distribution servers;

and wherein the one or more distribution servers including one or more distribution computer programs are operative to:

a) manage a hierarchical list of at least some of the plurality of client computers, wherein the hierarchical list uniquely identifies each of the client computers on the hierarchical list using a computer identification and wherein the hierarchical list is configured to arrange and group the at least some of the plurality of client computers into one or more computer groups;

b) assign tasks to one or more client computers managed in the hierarchical list, wherein the tasks are assigned to individual ones of the client computers on the hierarchical list based on the computer identification or to groups of computers on the hierarchical list based on the computer groups, wherein the tasks include at least one item selected from the group: a file, a script or a command; and c) store the tasks assigned to the client computers in the hierarchical list;

and wherein the particular client computer having installed thereon the client software component and the client service, the client software component and client service operative on the particular client computer to:

i) connect to at least one of the distribution servers;

ii) request one or more scheduled tasks from the at least one distribution servers, the one or more scheduled tasks having been previously assigned to the particular client computer using the hierarchical list;

iii) receive the one or more scheduled tasks, the one or more scheduled tasks including at least one of a file, a script, or a command; and iv) process the one or more scheduled tasks, wherein to process the one or more scheduled tasks, the client software component and client service are operative on the particular client computer to:

i) determine whether the particular client computer is licensed to execute the one or more scheduled tasks;

ii) determine whether a special account is required to execute the one or more scheduled tasks;

iii) automatically log into the particular client computer using the special account when the particular client computer is licensed to execute the one or more scheduled tasks and requires the special account to execute the one or more scheduled tasks; and iv) use the special account to perform the one or more scheduled tasks.

2. A method for distributing tasks from a distribution server to a client computer, comprising:

i) distributing a client software component installation file to the client computer from the distribution server;

ii) distributing a client service installation file to the client computer from the distribution server; and iii) remotely invoking from the distribution server, the client software component installation file and the client service installation file to install a client software component and a client service, respectively, wherein the client software component and the client service are associated with one another when installed on the client computer, and wherein the client software component and the client service are first installed by the installation on the client computer;

and performing by the distribution server:

a) managing a hierarchical list of at least some of a plurality of client computers, wherein the hierarchical list uniquely identifies each of the client computers on the hierarchical list using a computer identification and wherein the hierarchical list is configured to arrange and group the at least some of the plurality of client computers into one or more computer groups and wherein the client computer is included in the plurality of client computers;

b) assigning tasks to one or more client computers of the at least some of the plurality of client computers managed in the hierarchical list, wherein the tasks are assigned to individual ones of the client computers on the hierarchical list based on the computer identification or to groups of computers on the hierarchical list based on the computer groups, wherein the tasks include at least one item selected from the group: a file, a script or a command; and c) storing the tasks assigned to the client computers in the hierarchical list, wherein at least one of the tasks assigned to one of the client computers is performed at least in part using at least one of: (a) the client software component or (b) the client service component installed on the client computers;

and wherein the client computer having installed thereon the client software component and the client service, performs:

d) connecting to the distribution server via the client software component and the client service;

e) requesting one or more scheduled tasks from the distribution server, the one or more scheduled tasks having been previously assigned to the client computer using the hierarchical list;

f) receiving the one or more scheduled tasks, the one or more scheduled tasks including at least one of a file, a script, or a command; and g) processing the one or more scheduled tasks wherein processing the one or more scheduled tasks further comprises:

i) determining whether the client computer is licensed to execute the one or more scheduled tasks;

ii) determining whether a special account is required to execute the one or more scheduled tasks;

iii) automatically logging into the client computer using the special account when the client computer is licensed to execute the one or more scheduled tasks and requires the special account to execute the one or more scheduled tasks; and iv) using the special account to perform the one or more scheduled tasks.

* * * * *

UNITED STATES PATENT AND TRADEMARK OFFICE
CERTIFICATE OF CORRECTION

| | | |
|---|---|---|
| PATENT NO. | : 7,707,571 B1 | Page 1 of 1 |
| APPLICATION NO. | : 10/042119 | |
| DATED | : April 27, 2010 | |
| INVENTOR(S) | : Emily J. Harris et al. | |

It is certified that error appears in the above-identified patent and that said Letters Patent is hereby corrected as shown below:

On the Sheet 2 of 13, in Box 310, in Figure 4, line 1, delete "LOCATON" and insert -- LOCATION --, therefor.

In column 6, line 62, after "instructions" insert -- . --.

In column 28, line 48, in Claim 2, delete "tasks" and insert -- tasks, --, therefor.

Signed and Sealed this

First Day of June, 2010

David J. Kappos
*Director of the United States Patent and Trademark Office*